United States Patent
Fukuda

(10) Patent No.: US 8,274,767 B2
(45) Date of Patent: Sep. 25, 2012

(54) MAGNETIC ENERGY REGENERATION SWITCH PROVIDED WITH PROTECTION CIRCUIT

(75) Inventor: Shiro Fukuda, Tokyo (JP)

(73) Assignee: MERSTech, Inc., Tokyo (JP)

( * ) Notice: Subject to any disclaimer, the term of this patent is extended or adjusted under 35 U.S.C. 154(b) by 0 days.

(21) Appl. No.: 13/062,514

(22) PCT Filed: Nov. 13, 2008

(86) PCT No.: PCT/JP2008/070687
§ 371 (c)(1),
(2), (4) Date: May 27, 2011

(87) PCT Pub. No.: WO2010/055568
PCT Pub. Date: May 20, 2010

(65) Prior Publication Data
US 2011/0222192 A1    Sep. 15, 2011

(51) Int. Cl.
*H02H 7/00* (2006.01)
(52) U.S. Cl. .......................................... 361/18
(58) Field of Classification Search ....................... 361/18
See application file for complete search history.

(56) References Cited

U.S. PATENT DOCUMENTS

| | | | | |
|---|---|---|---|---|
| 4,855,888 A | * | 8/1989 | Henze et al. | 363/17 |
| 6,147,881 A | * | 11/2000 | Lau | 363/17 |
| 6,639,767 B2 | * | 10/2003 | Ito et al. | 361/18 |
| 6,930,893 B2 | * | 8/2005 | Vinciarelli | 363/17 |
| 2011/0032652 A1 | * | 2/2011 | Shimada | 361/91.2 |
| 2011/0199061 A1 | * | 8/2011 | Shimada | 323/237 |

FOREIGN PATENT DOCUMENTS

| | | |
|---|---|---|
| JP | H007-0065988 A | 10/1995 |
| JP | 2000-236679 A | 8/2000 |
| JP | 3634982 B | 3/2005 |
| JP | 2006-109583 A | 4/2006 |
| JP | 2007-058676 A | 3/2007 |
| JP | 2008-092745 A | 4/2008 |

* cited by examiner

*Primary Examiner* — Rexford Barnie
*Assistant Examiner* — Ann Hoang
(74) *Attorney, Agent, or Firm* — Keiji Matsaki; International Knowledge Asset Office

(57) ABSTRACT

A protection circuit equipped magnetic energy recovery switch including a magnetic energy recovery switch having at least two reverse-conductive type semiconductor switches and two capacitors employs a protection circuit and control method for protecting the capacitors against an overvoltage or short-circuited discharge, and protecting the reverse-conductive type semiconductor switches and a load against an overvoltage or overcurrent, and can be used as a controller or a current limiter.

22 Claims, 22 Drawing Sheets

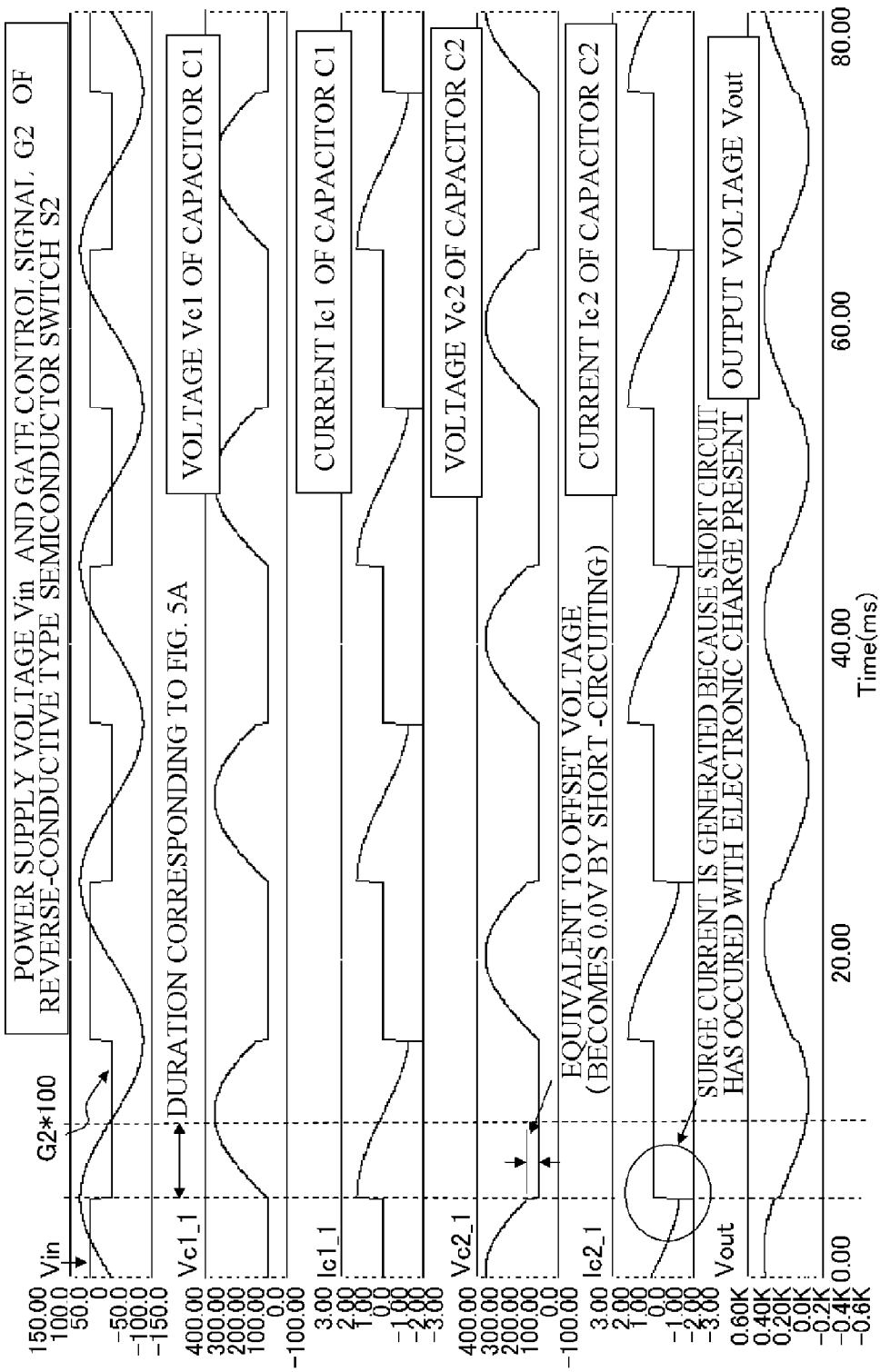

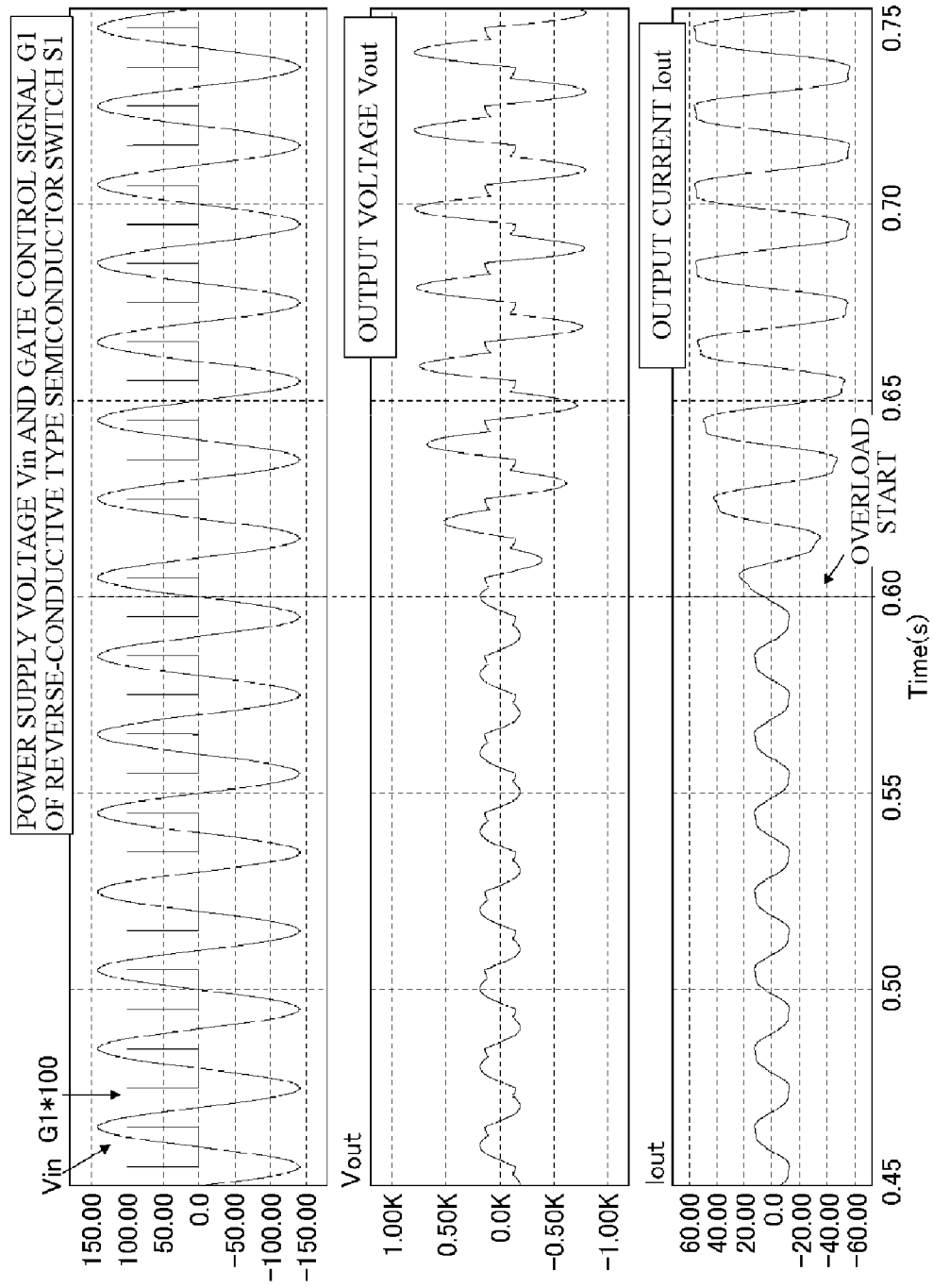

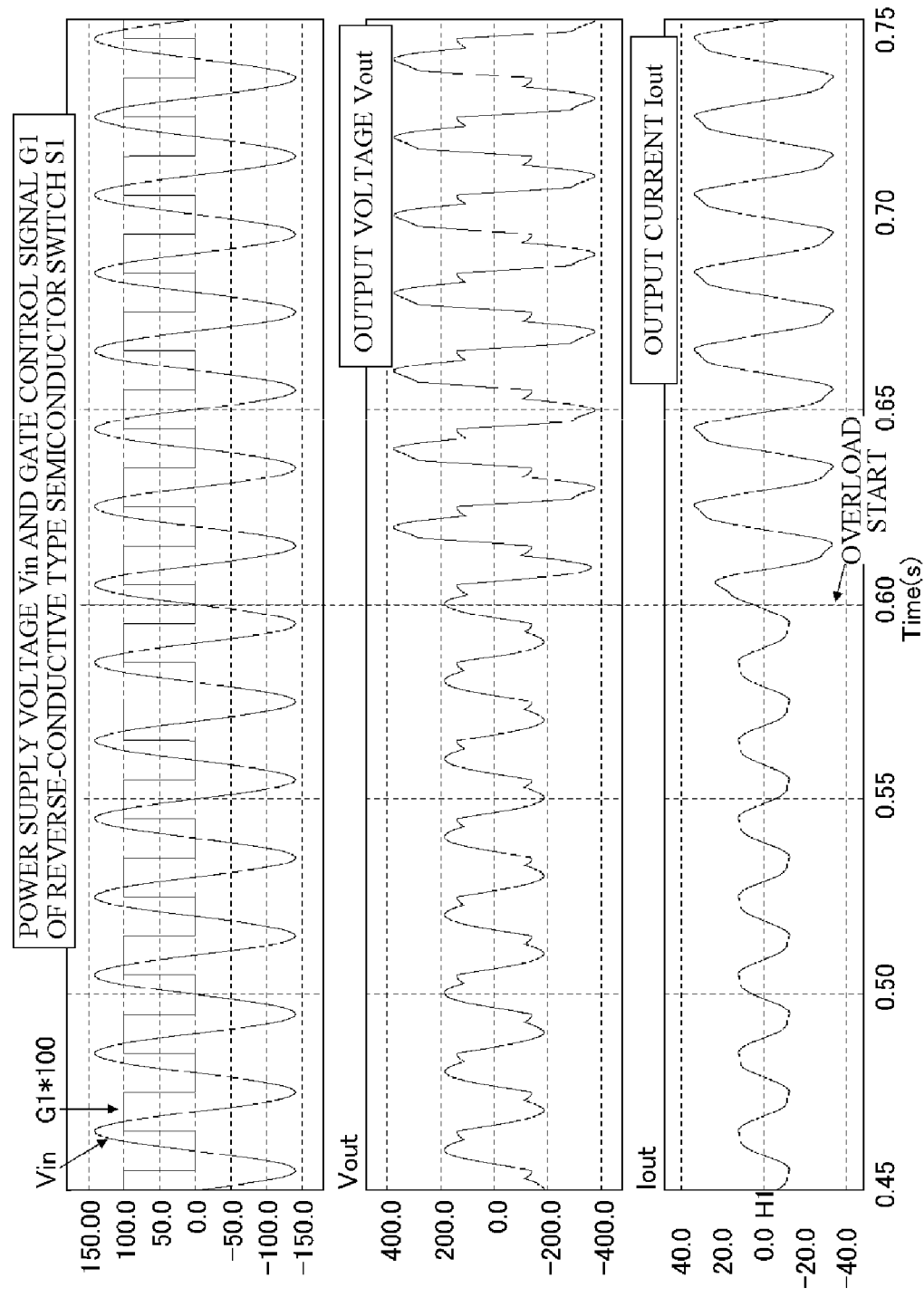

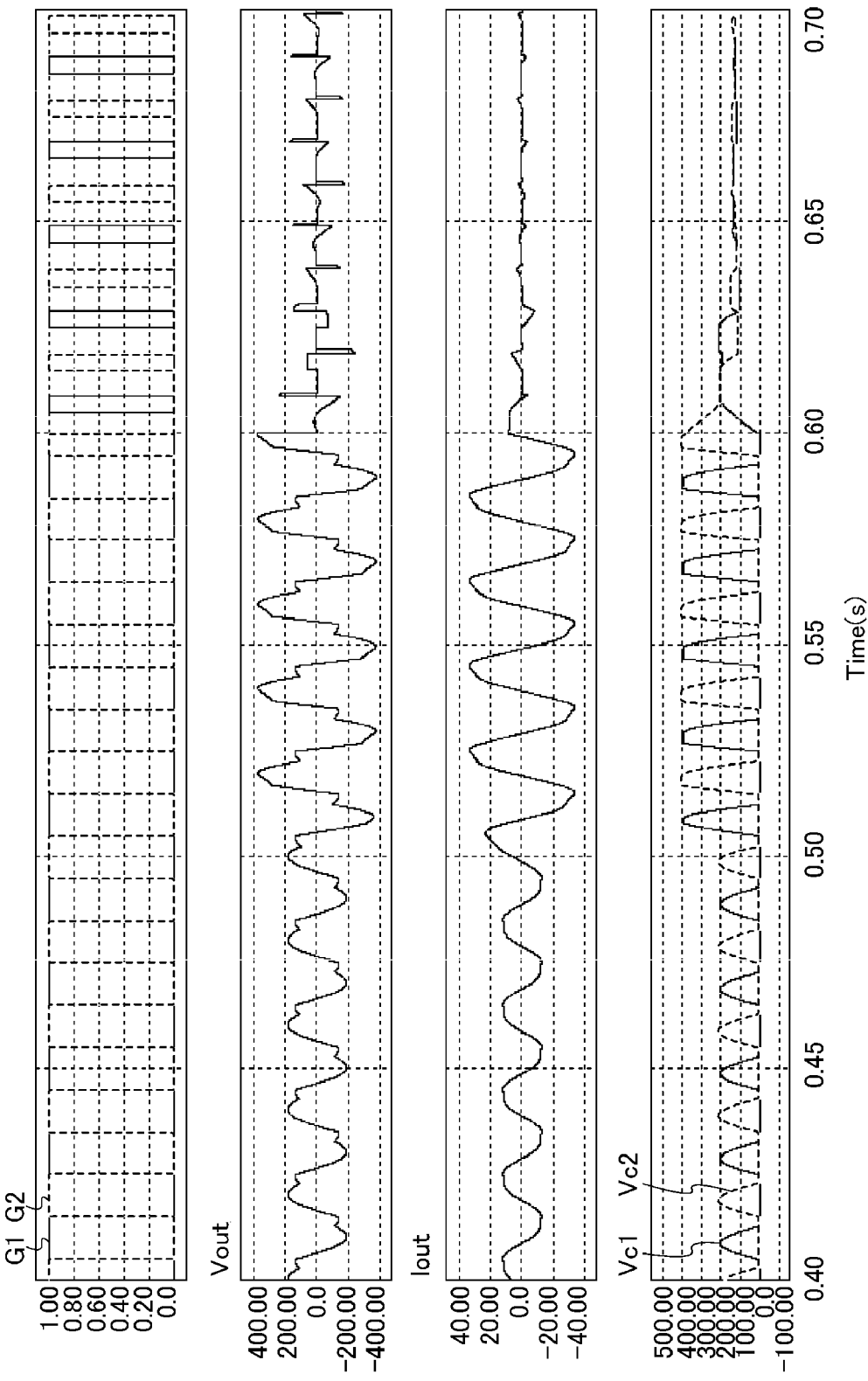

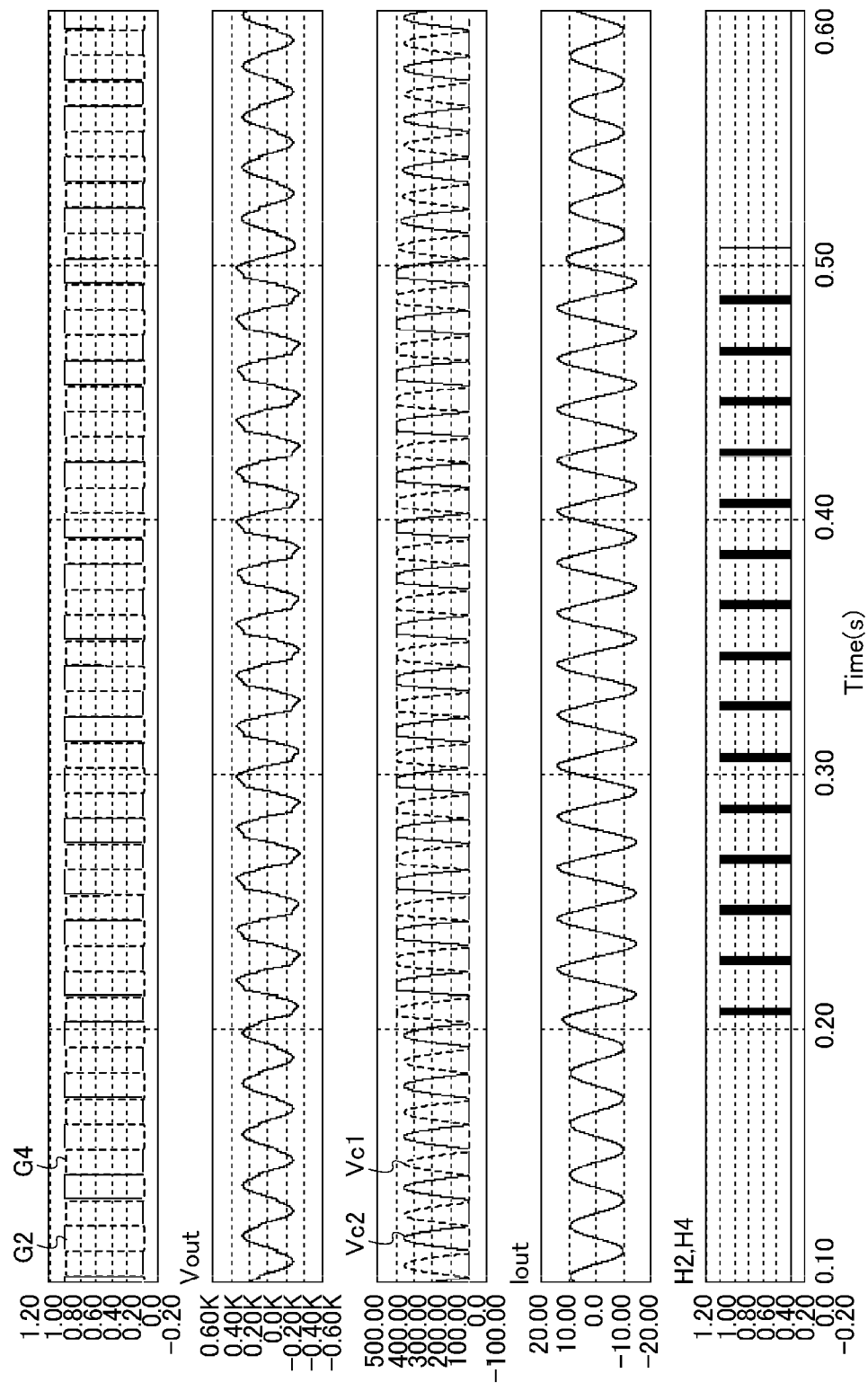

MAGNETIC ENERGY REGENERATION SWITCH PROVIDED WITH PROTECTION CIRCUIT

TECHNICAL FIELD

The present invention relates to a protection circuit equipped magnetic energy recovery switch, and, more particularly, to a protection circuit equipped magnetic energy recovery switch connected between an AC power supply and a load and employing a protection circuit and a control method for protecting capacitors constituting the magnetic energy recovery switch and recovering and storing magnetic energy against an overvoltage or short-circuit discharge, and protecting reverse-conductive type semiconductor switches and a load against an overvoltage or overcurrent.

BACKGROUND ART

Nowadays, electric power energy systems are important social infrastructure which cannot be stopped even for a moment. However, in an abnormality or a trouble of a load that causes an overcurrent, a measure taken thereagainst is a high-speed breaking of the load, as is exercised by a fuse or a high-speed mechanical switch. Nevertheless, there has been a demand for a high-function switch, so called a controller or a current limiter, which is capable of limiting only the overcurrent and allowing a continued operation without the complete stop of the load, as well as a system recovery to a full operation after the return to its normality.

Electric power system must be designed to withstand a short-time overcurrent, such as a rush current at the time an incandescent lamp is lit, a rush current when an induction motor is started, or an overcurrent caused by initial excitation inrush of a transformer. It is important to distribute yield strength of each machine appropriately. A semiconductor-type inverter power supply in recent years, such as a fuel battery inverter, for example, cannot withstand, in many cases, a peak current which is almost ten times the excitation inrush current of a transformer. Inverter power supplies, therefore, have various soft-start functions, which work if there is one load for one inverter power supply but have a difficulty in coping with later-started ones of a plurality of loads connected to one inverter power supply.

Electric power systems are designed in consideration of protective coordination, the current and the duration thereof to withstand an accidental, short-time overcurrent. However, such systems merely perform a protective coordination aimed at a prevention of the influence over the upstream by selectively breaking the accident current by a switch. It is a recent social demand to achieve a continuous operation as far as possible without power breaking in an accident that takes place in the downstream of a system.

As for a current limiter which limits an accident current with series elements, an application based on a transient phenomenon between superconductivity and normal conduction is developed. This is because the capacity of the breaker becomes extremely large as the accident current becomes excessively large, so that reduction in accident current to a half or so, if possible, can reduce the size and cost the breaker. In addition, such a current limiter is demanded.

There is a magnetic energy recovery switch (hereinafter called "MERS") which can perform power control on a load. The MERS includes a full bridge circuit having four reverse-conductive type semiconductor switches, and a capacitor connected between the DC terminals of the full bridge circuit. The capacitor serves to store magnetic energy when the current is cut off, and recover the magnetic energy to the load. A gate control signal is sent to the gates of a pair of reverse-conductive type semiconductor switches positioned diagonally in the full bridge circuit. The current phase can be controlled by alternately turning on/off the two pairs of reverse-conductive type semiconductor switches so that one pair of reverse-conductive type semiconductor switches are turned on when the other pair of reverse-conductive type semiconductor switches are turned off by the gate control signal. Further, if the phase of the gate control signal is controlled in synchronization with the frequency of the AC power supply, the current phase can be controlled arbitrarily. When the load connected to the MERS is an inductive load, a voltage to the load can be increased or decreased by advancing the current phase. This has already registered as a patent and is disclosed (see Patent Document 1). The MERS in this mode is called "full-bridge type MERS".

It has been applied, and laid open, and is publicly known that as the MERS's include simpler MERS circuits which can be constituted by two reverse-conductive type semiconductor switches though partly limited the functions of the full-bridge type MERS are (see Patent Document 2 and Patent Document 3).

Patent Document 1: Japanese Patent No. 3634982
Patent Document 2: Unexamined Japanese Patent Application KOKAI Publication No. 2007-58676
Patent Document 3: Unexamined Japanese Patent Application KOKAI Publication No. 2008-92745

Of the simple MERS circuits, a so-called vertical half-bridge type MERS is a half-bridged mode of a full bridge circuit. More specifically, of the four reverse-conductive type semiconductor switches connected in bridge in the full-bridge type MERS, two reverse-conductive type semiconductor switches which are connected to one AC terminal are replaced with diodes connected in the reverse directions. With a capacitor having the same capacity being added, the capacitors are respectively connected in parallel to the diodes.

Of the simple MERS circuits, a so-called horizontal half-bridge type MERS is also a half-bridged mode of a full bridge circuit, and differs from the vertical half-bridge type MERS in a half-bridging approach. In the horizontal half-bridge circuit a lower half of the full bridge circuit is used. The lower half means the part that is the lower one when the full bridge is separated laterally (horizontally) by the capacitor connected therein. Further, this horizontal half-bridge circuit has an additional capacitor with the same capacity. More specifically, two circuits each having a capacitor connected in parallel to the reverse-conductive type semiconductor switch are connected in series to each other, and the reverse-conductive type semiconductor switches are respectively connected in series to each other at the time of connecting the circuits in series.

Although the vertical half-bridge type MERS and the horizontal half-bridge type MERS need twice the quantity of capacitors in use as compared with the full-bridge type MERS, the quantity of reverse-conductive type semiconductor switches in user is reduced to a half. Therefore, the number of reverse-conductive type semiconductor switches through which the current passes is reduced and conduction loss is reduced. Because the current duty per a single capacitor (the amount of the current passing through a capacitor per unit time) is reduced to a half, the life of capacitors generally becomes longer. In addition, the basic electric characteristic relating to recovery of magnetic energy becomes substantially equivalent to that of the full-bridge type MERS. Both of the vertical half-bridge type MERS and horizontal half-bridge type MERS are advantageous over the full-bridge type MERS particularly at the time of application targeting a large current.

DISCLOSURE OF THE INVENTION

Problems to be Solved by the Invention

If the vertical half-bridge type MERS and horizontal half-bridge type MERS can be used as a controller or a current limiter, the original intention is achieved. However, problems arise in their usages.

When the resonance frequency in the vertical half-bridge type MERS that is determined by the capacitor and the reactance component of a load is lower than the switching frequency of the gate control signal to be supplied to the gates of the reverse-conductive type semiconductor switches, the electric charges of the two capacitors are not discharged completely and remain, so that a voltage remains in each capacitor (hereinafter called "offset voltage"; a state where a voltage remains in a capacitor is called "DC offset mode"). While one capacitor is charging or discharging, the offset voltage remains in the other capacitor. Therefore, the voltage in the capacitor which is charging/discharging and the offset voltage held in the other capacitor are applied to the reverse-conductive type semiconductor switch in an OFF state, the applied voltage may exceed the rated voltage of the reverse-conductive type semiconductor switch and the capacitor.

When the resonance frequency in the horizontal half-bridge type MERS that is determined by the capacitor and the reactance component of a load is lower than the switching frequency of the gate control signal to be supplied to the gates of the reverse-conductive type semiconductor switches, an offset voltage is likewise generated in each capacitor; with the offset voltage being generated in one capacitor, when the other capacitor is charged, the capacitor where the offset voltage is generated is subjected to short-circuit discharge (hereinafter the state in the horizontal half-bridge type MERS where short-circuit discharge of the capacitor is caused is called "capacitor short-circuiting mode"). In case of the capacitor short-circuiting mode, short-circuit discharge of the capacitor is caused, so that an overcurrent flows to the reverse-conductive type semiconductor switches and the load. This may damage the reverse-conductive type semiconductor switches.

It is inevitable from the viewpoint of application that the vertical half-bridge type MERS and horizontal half-bridge type MERS should be used while always grasping the electric charge of the capacitor which affects the withstand voltage of the capacitor and the current capacity and withstand voltage of the reverse-conductive type semiconductor switch, i.e., the state of the voltage of the capacitor.

The DC offset mode and the capacitor short-circuiting mode can be brought up by the overcurrent of a load as well as the disturbance of the frequency of the power supply. In addition, the load's overcurrent occurs more frequently than the disturbance of the frequency of the power supply. If excess magnetic energy originating from the load's overcurrent is controlled in the normal operations of the vertical half-bridge type MERS and the horizontal half-bridge type MERS, unexpected large magnetic energy may be generated by recovery. At this time, the load voltage becomes an overvoltage. This overvoltage may exceed the withstand voltage of the load, causing failure in the load or damaging it. When the overcurrent of a load occurs, the load is protected if the capacitors and reverse-conductive type semiconductor switches can be protected promptly. The function of protecting the capacitors and reverse-conductive type semiconductor switches is important and eliminates the need for the capacitors and reverse-conductive type semiconductor switches themselves to have excessive overload capacities, which is important in reducing the size of the MERS and reducing the cost.

In protecting the capacitors and reverse-conductive type semiconductor switches, it is easy to add a circuit for cutting off the MERS circuit itself, or a circuit for bypassing the input terminal and output terminal of the MERS circuit to go to the state of bypassing the MERS circuit and simply stop the functions of the MERS. However, this stops the operation of a load or significantly changes the operational conditions (e.g., changing the full load operation to an intermediate load operation), which, at the same time, influences another load operating in parallel to the MERS. Conventionally, this is inevitable.

The vertical half-bridge type MERS and the horizontal half-bridge type MERS have two reverse-conductive type semiconductor switches and two capacitors, can freely set the ON/OFF timing of the reverse-conductive type semiconductor switches. If the control method which makes the adequate use of them is used, therefore, it is possible to execute an operation of inhibiting or limiting the overcurrent while maintaining the maximum performance without simply cutting off or bypassing the MERS circuit itself at the time of the overcurrent of a load, and returning the operation to the normal operation when the factor of causing the overcurrent is eliminated. If this operation is possible, the functions of the vertical half-bridge type MERS and the horizontal half-bridge type MERS can be enhanced.

The present invention has been made in consideration of those circumstances, and it is an object of the invention to provide a protection circuit equipped magnetic energy recovery switch which protects a vertical half-bridge type MERS and a horizontal half-bridge type MERS against an overvoltage originating from the offset voltage of a capacitor in the vertical half-bridge type MERS, a short-circuit discharge originating from the offset voltage of a capacitor in the horizontal half-bridge type MERS, and an overvoltage or overcurrent originating from an abnormality in a load or damage thereof.

Means for Solving the Problems

The above object of the invention is achieved by the following means.

(1) It is achieved by a protection circuit equipped magnetic energy recovery switch comprising:

a magnetic energy recovery switch, interposed between an AC power supply and a load, for storing magnetic energy of a current when the current is cut off, and recovering the magnetic energy to the load; and protection means for protecting the magnetic energy recovery switch against an overvoltage or an overcurrent, wherein the magnetic energy recovery switch includes a bridge circuit having two series-connected reverse-conductive type semiconductor switches and two series-connected diodes, two series-connected capacitors respectively connected in parallel to the two series-connected diodes, and control means that controls phases of gate control signals for the reverse-conductive type semiconductor switches in such a way as to alternately perform ON/OFF control on the reverse-conductive type semiconductor switches in synchronization with a frequency of the AC power supply, wherein the protection means includes a voltage detection unit connected between DC terminals of the bridge circuit to detect a voltage across the two series-connected capacitors, and a discharge circuit connected between the DC terminals of the bridge circuit and having a discharge resistor and a discharge switch connected in series to each other, and controls a gate of the discharge switch so as to short-circuit the discharge switch when an output of the voltage detection unit exceeds a predetermined value, thereby discharging electric charges of the capacitors through the discharge resistor.

(2) Further, the foregoing object is also achieved by a protection circuit equipped magnetic energy recovery switch comprising:

a magnetic energy recovery switch, interposed between an AC power supply and a load, for storing magnetic energy of a current when the current is cut off, and recovering the magnetic energy to the load; and protection means for protecting the magnetic energy recovery switch against an overvoltage or an overcurrent, wherein the magnetic energy recovery switch includes a bridge circuit having two series-connected reverse-conductive type semiconductor switches and two series-connected diodes, first and second capacitors connected in series to each other and respectively connected in parallel to the two series-connected diodes, and control means that controls phases of gate control signals for the reverse-conductive type semiconductor switches in such a way as to alternately perform ON/OFF control on the reverse-conductive type semiconductor switches in synchronization with a frequency of the AC power supply, wherein the protection means includes, between DC terminals of the bridge circuit, a first voltage detection unit connected in parallel to the first capacitor to detect a voltage of the first capacitor, a second voltage detection unit connected in parallel to the second capacitor to detect a voltage of the second capacitor, a first discharge circuit connected in parallel to the first capacitor and having a first discharge resistor and a first discharge switch connected in series to each other, a second discharge circuit connected in parallel to the second capacitor and having a second discharge resistor and a second discharge switch connected in series to each other, and controls gates of the discharge switches so as to short-circuit the first discharge switch when an output of the first voltage detection unit exceeds a predetermined value, thereby discharging electric charge of the first capacitor through the first discharge resistor, and short-circuit the second discharge switch when an output of the second voltage detection unit exceeds a predetermined value, thereby discharging electric charge of the second capacitor through the second discharge resistor.

(3) Further, the foregoing object is also achieved by a protection circuit equipped magnetic energy recovery switch comprising:

a magnetic energy recovery switch, interposed between an AC power supply and a load, for storing magnetic energy of a current when the current is cut off, and recovering the magnetic energy to the load; and protection means for protecting the magnetic energy recovery switch against an overvoltage or an overcurrent, wherein the magnetic energy recovery switch includes two inversely series-connected reverse-conductive type semiconductor switches, series-connected first and second capacitors connected in parallel thereto, a wiring connecting an intermediate node between the two inversely series-connected reverse-conductive type semiconductor switches and an intermediate node between the two series-connected first and second capacitors, and control means that controls phases of gate control signals for the reverse-conductive type semiconductor switches in such a way as to alternately perform ON/OFF control on the reverse-conductive type semiconductor switches in synchronization with a frequency of the AC power supply, wherein the protection means includes a first voltage detection unit connected in parallel to the first capacitor to detect a voltage of the first capacitor, a second voltage detection unit connected in parallel to the second capacitor to detect a voltage of the second capacitor, a first discharge circuit connected in parallel to the first capacitor and having a first discharge resistor and a first discharge switch connected in series to each other, a second discharge circuit connected in parallel to the second capacitor and having a second discharge resistor and a second discharge switch connected in series to each other, and controls gates of the discharge switches so as to short-circuit the first discharge switch when an output of the first voltage detection unit exceeds a predetermined value, thereby discharging electric charge of the first capacitor through the first discharge resistor, and short-circuit the second discharge switch when an output of the second voltage detection unit exceeds a predetermined value, thereby discharging electric charge of the second capacitor through the second discharge resistor.

(4) It is also achieved by the subject matter as specified in any one of (1) to (3), wherein the protection means further includes a current detection unit, interposed between the AC power supply and the load, for detecting a current which flows across the load, and performs current limiting control by making a duty ratio of an ON pulse of the gate control signal of the reverse-conductive type semiconductor switch smaller than 0.5 when the output of the current detection unit exceeds a predetermined value.

(5) It is also achieved by the subject matter as specified in (4), wherein when the output of the current detection unit returns to the predetermined value, the protection means sets back the duty ratio of the ON pulse of the gate control signal of the reverse-conductive type semiconductor switch to 0.5 and terminates current limiting control.

(6) It is also achieved by the subject matter as specified in any one of (1) to (4), wherein when a period of time during which the output of the voltage detection unit is greater than the predetermined value exceeds a predetermined time, the protection means controls gates of the reverse-conductive type semiconductor switches so as to turn off all the reverse-conductive type semiconductor switches to cut off the current.

(7) It is also achieved by the subject matter as specified in any one of (1) to (4), wherein when a period of time during which the output of the voltage detection unit is greater than the predetermined value exceeds a predetermined time, the protection means controls the gate of the discharge switch so as to discharge electric charges of the two capacitors to set the voltage to zero, and then controls gates of the reverse-conductive type semiconductor switches so as to turn on all the reverse-conductive type semiconductor switches so that the current becomes conductive in both directions.

(8) It is also achieved by the subject matter as specified in any one of (1) to (3), wherein the protection means further includes a current detection unit, interposed between the AC power supply and the load, for detecting a current which flows across the load, and controls gates of the reverse-conductive type semiconductor switches so as to turn off all the reverse-conductive type semiconductor switches to cut off the current, when an output of the current detection unit exceeds a predetermined value.

(9) It is also achieved by the subject matter as specified in (1), wherein the protection means further includes a current detection unit, interposed between the AC power supply and the load, for detecting a current which flows across the load, and controls gates of the reverse-conductive type semiconductor switches so as to turn off only that of the reverse-conductive type semiconductor switches which is on, thereby cutting off the current, when an output of the current detection unit exceeds a predetermined value.

Effect of the Invention

The invention can provide a protection circuit equipped magnetic energy recovery switch whose protection circuit can protect a vertical half-bridge type MERS and a horizontal half-bridge type MERS against an overvoltage originating from the offset voltage of a capacitor in the vertical half-bridge type MERS, a capacitor short-circuit discharge originating from the offset voltage of a capacitor in the horizontal half-bridge type MERS, and an overvoltage or overcurrent originating from an abnormality in a load or damage thereof.

BRIEF DESCRIPTION OF DRAWINGS

FIG. 5B is a waveform diagram showing the operation when the current flows as in FIG. 5A and showing the state of a capacitor short-circuiting mode;

FIG. 6A is a waveform diagram showing results of simulation of the generation of an overvoltage and overcurrent in the conventional vertical half-bridge type magnetic energy recovery switch;

FIG. 8A is a diagram showing results of simulation of the operation of the first embodiment of the protection circuit equipped magnetic energy recovery switch according to the invention;

FIG. 9C is a waveform diagram showing results of further simulation of the operation of the first embodiment of the protection circuit equipped magnetic energy recovery switch according to the invention;

FIG. 13B is a waveform diagram showing results of simulation of the operation of the third embodiment of the protection circuit equipped magnetic energy recovery switch according to the invention;

Figure 1:
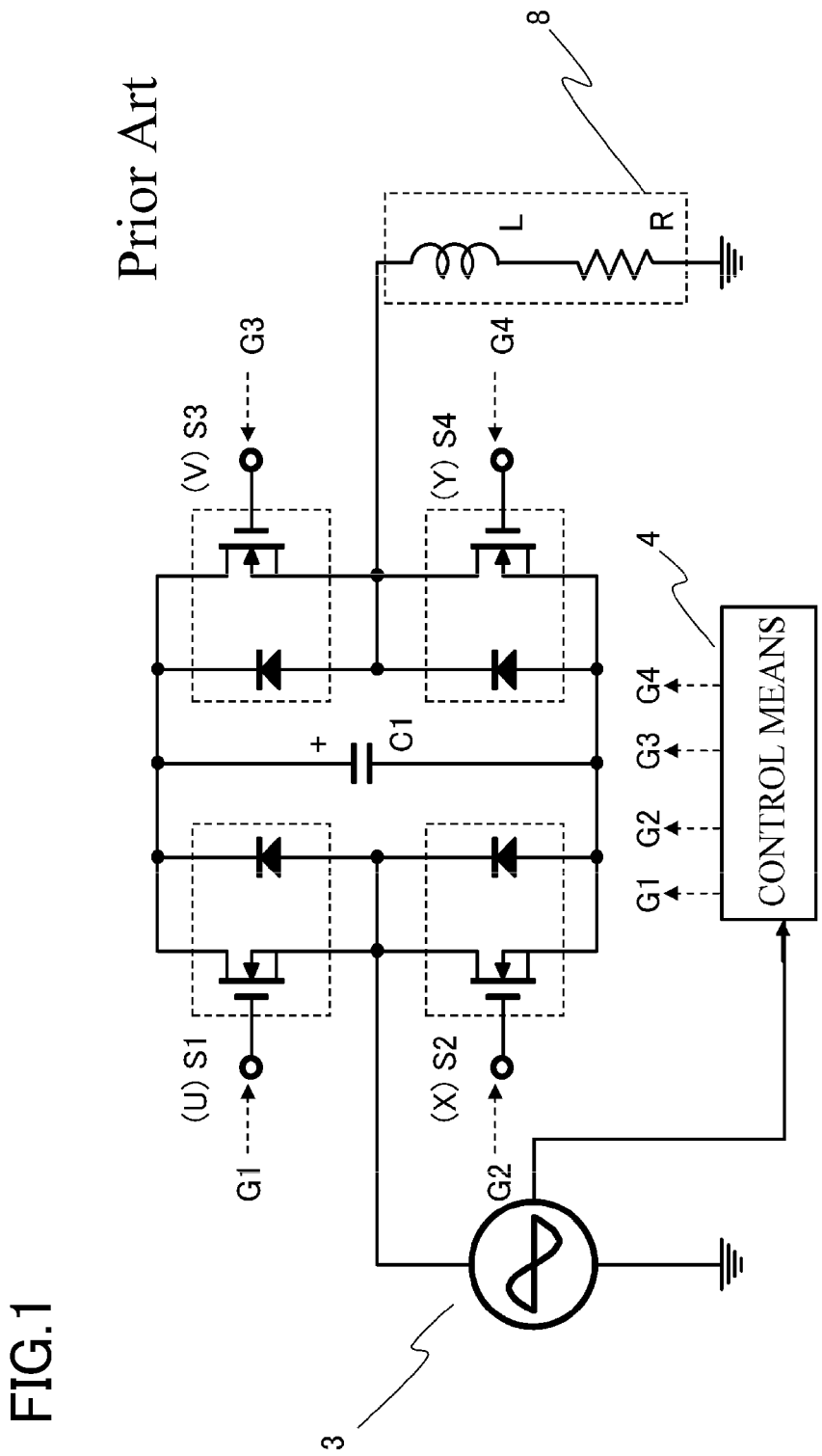
FIG. 1 shows an AC power supply unit using a conventional full-bridge type magnetic energy recovery switch.

1a, 1b: bridge circuit (half-bridge circuit)
3: AC power supply
4: control means
5, 501, 502: voltage detection unit
6, 601, 602: discharge circuit
61, 611, 612: discharge resistor
62, 621, 622: discharge switch
7: current detection unit
8: load
L: reactance component of load
R: resistive component of load
10: protection circuit
S1, S2, S3, S4: reverse-conductive type semiconductor switch
G1, G2, G3, G4: gate control signal
H1, H2, H4: gate control signal
C1, C2: capacitor
D1, D2: auxiliary diode
AC: AC terminal of bridge circuit
DC(P), DC(N): DC terminal of bridge circuit
Vin: power supply voltage
Iin: input current
Vc1: voltage of capacitor C1
Vc2: voltage of capacitor C2
Ic1: current of capacitor C1
Ic2: current of capacitor C2
Vout: output voltage
Iout: output current

BEST MODE FOR CARRYING OUT THE INVENTION

Preferred embodiments of the present invention will be described below with reference to the accompanying drawings. To avoid the redundant description adequately, same reference numerals are given to components, members and processes which are the same as or equivalent to those shown in the diagrams. It is to be noted that the embodiments do not limit the invention but are just illustrative, and all the features of the embodiments described and combinations thereof should not necessarily be essential to the invention.

First Embodiment

Next, a protection circuit equipped magnetic energy recovery switch according to the first embodiment will be described.

Figure 7:
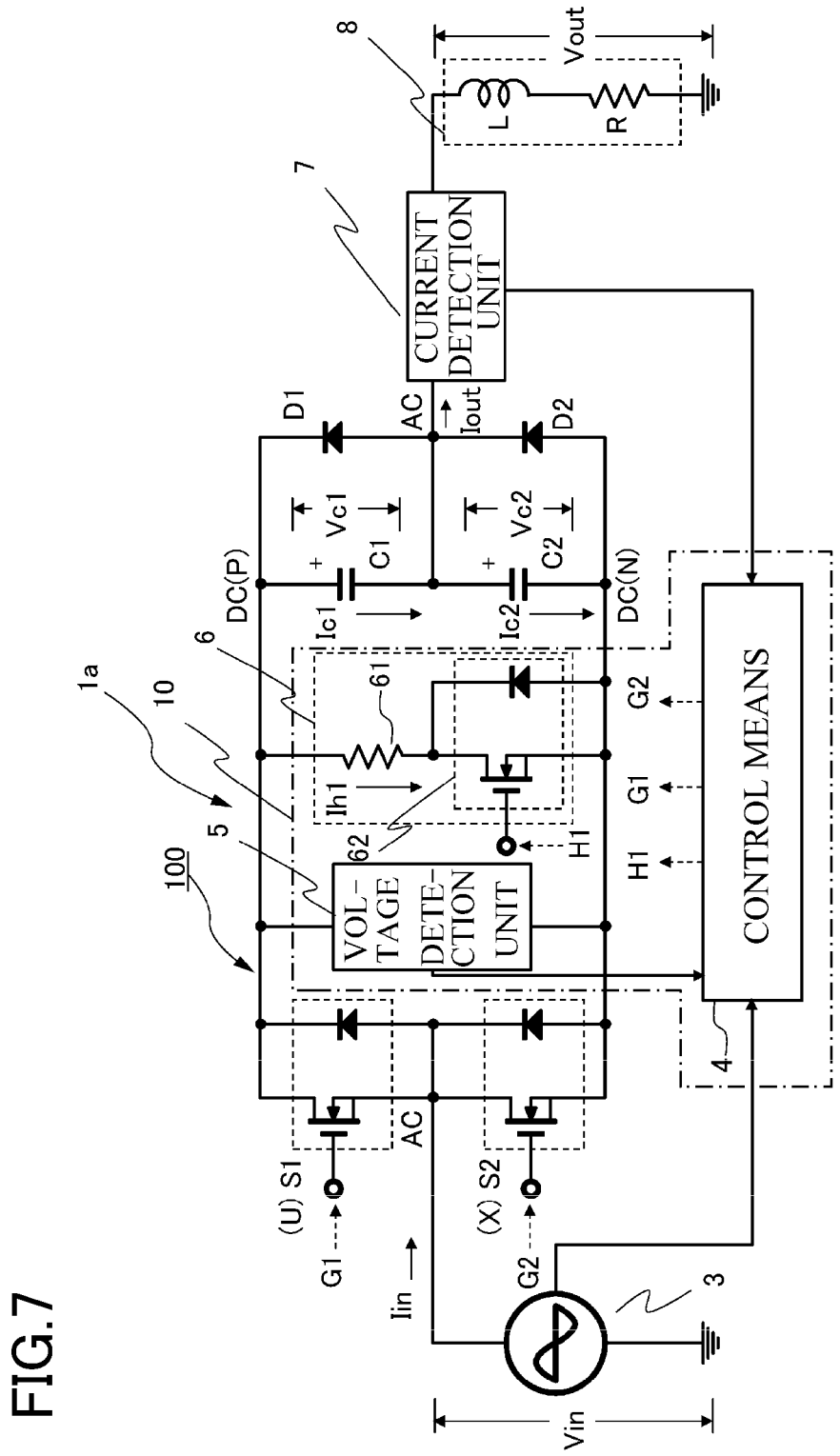
FIG. 7 is a circuit block diagram showing a first embodiment of a protection circuit equipped magnetic energy recovery switch according to the present invention.

FIG. 7 is a circuit block diagram showing the configuration of a protection circuit equipped magnetic energy recovery switch 100 according to the first embodiment of the invention.

Figure 2:
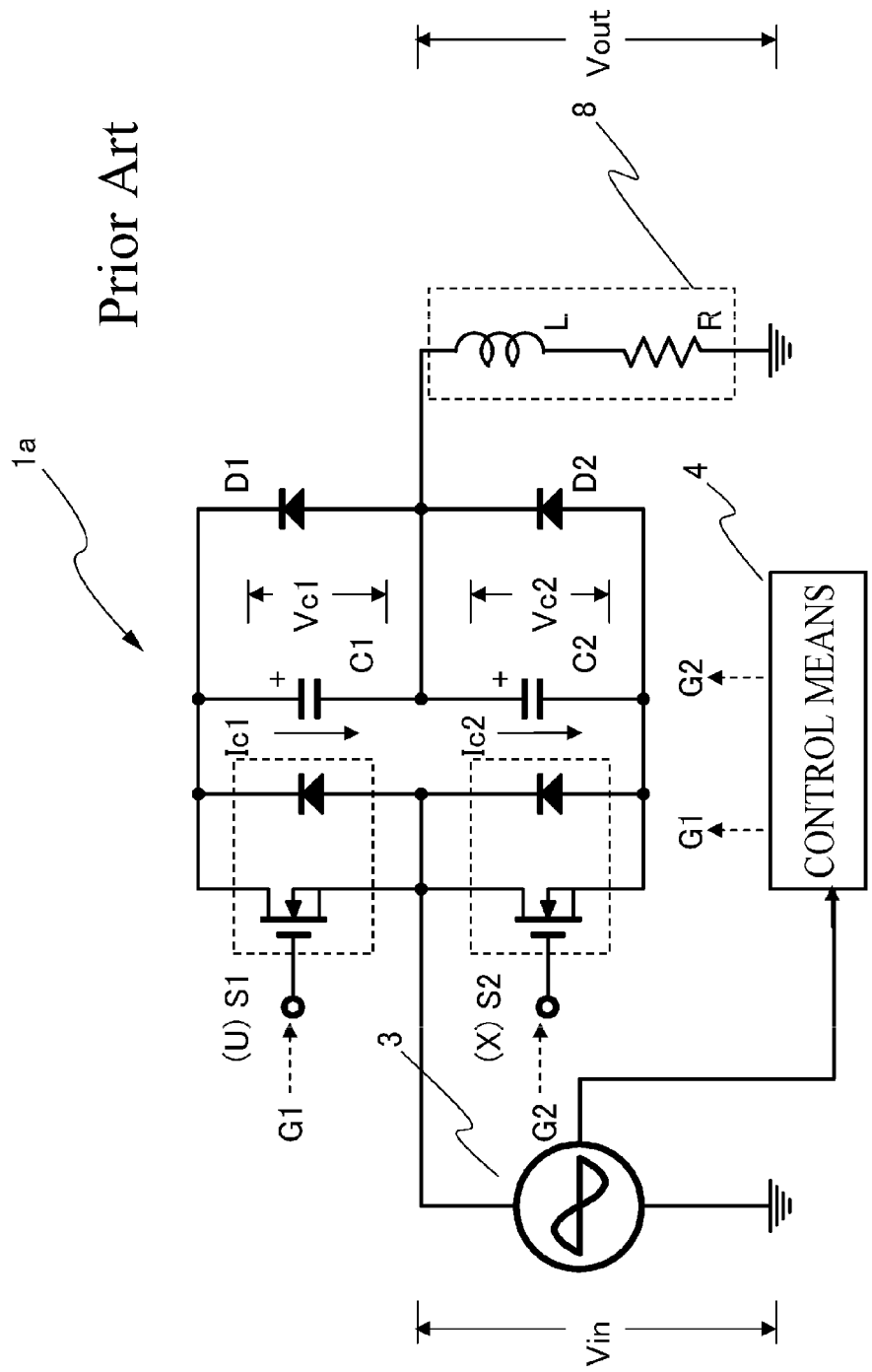
FIG. 2 shows an AC power supply unit using a conventional vertical half-bridge type magnetic energy recovery switch.
Figure 3A:
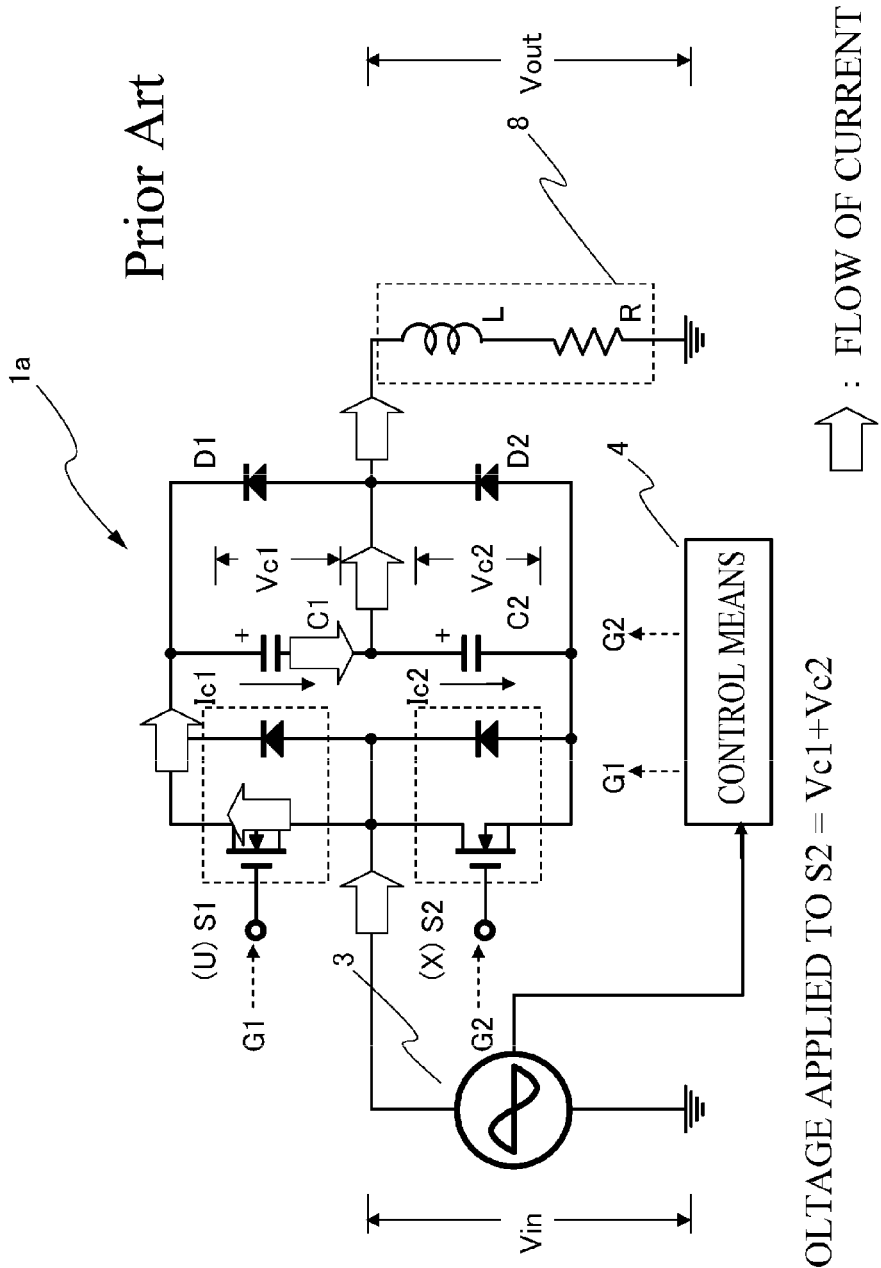
FIG. 3A is a diagram showing the flow of the current of the AC power supply unit using the conventional vertical half-bridge type magnetic energy recovery switch.
Figure 3B:
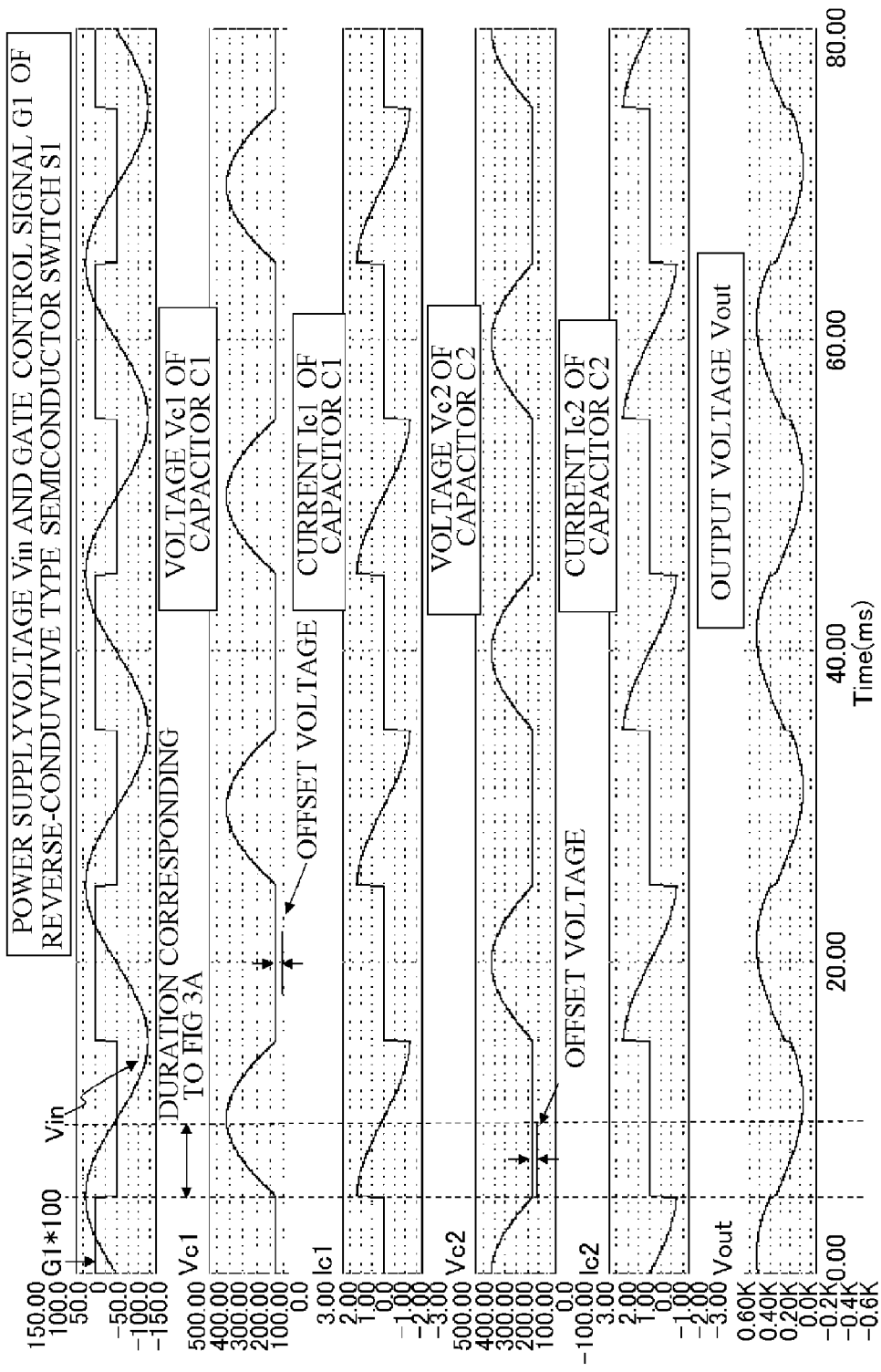
FIG. 3B is a waveform diagram showing the operation when the current flows as in FIG. 3A and showing the state of a DC offset mode.

This protection circuit equipped magnetic energy recovery switch 100 relates to a protection circuit equipped magnetic energy recovery switch having a protection circuit to protect an AC power supply unit 1a using a vertical half-bridge type MERS shown in FIG. 2 against an overvoltage and/or overcurrent.

More specifically, as shown in FIG. 7, the basic configuration of the protection circuit equipped magnetic energy recovery switch 100 is a vertical half-bridge type MERS which includes a bridge circuit (half-bridge circuit) having two reverse-conductive type semiconductor switches S1, S2 and two auxiliary diodes D1, D2, capacitors C1, C2 which are connected respectively in parallel to the auxiliary diodes D1, D2 between DC terminals DC(P) and DC(N) of the bridge circuit and store the magnetic energy of the bridge circuit when the current is cut off, and control means 4 which controls the phases of gate control signals G1, G2 in such a way as to alternately perform ON/OFF control on the reverse-conductive type semiconductor switches S1, S2 in synchronization with the frequency of the power supply.

The reverse-conductive type semiconductor switch S1, S2 has a self-turn-off type semiconductor element, such as FET or IGB, and a diode inversely connected in parallel thereto. When the frequency of the AC power supply is substantially low, a power MOSFET parasitic diode which has a long reverse recovery time can be used as the inversely parallel-connected diode.

This vertical half-bridge type MERS is interposed between an AC power supply 3 and a load 8 having a reactance component L and resistive component R. Specifically, the AC power supply 3 is connected to one AC terminal (AC) of the bridge circuit, and the load 8 is connected to the other AC terminal (AC), forming the AC power supply unit 1a.

A protection circuit 10 for protecting the vertical half-bridge type MERS against an overvoltage or overcurrent includes a voltage detection unit 5, which is connected between the DC terminals DC(P) and DC(N) of the bridge circuit and connected in parallel to the series circuit of the capacitors C1, C2 and detects the total voltage of the capacitors C1, C2, and a discharge circuit 6 likewise connected in parallel to the series circuit of the capacitors C1, C2. The discharge circuit 6 has a discharge resistor 61 and a discharge switch 62 connected in series to each other, and the ON/OFF of the discharge switch 62 is controlled by a gate control signal H1 for the discharge switch 62 supplied from the control means 4.

More specifically, the output of the voltage detection unit 5 is input to the control means 4, and is compared with a predetermined value (threshold value) prestored in the control means 4. When the output of the voltage detection unit 5 exceeds the threshold value, i.e., when the total voltage of the capacitor C1 and the capacitor C2 becomes an overvoltage, the control means 4 sends the gate control signal H1 to enable the gate of the discharge switch 62 to short-circuit the discharge switch 62 to discharge electric charges of the capacitor C1 and the capacitor C2 through the discharge resistor 61, thereby dropping both capacitor voltages. When the capacitor voltages return to a normal range, the control means 4 sends the gate control signal H1 to disable the gate of the discharge switch 62, turning off the discharge switch 62. The discharge switch 62, like the reverse-conductive type semiconductor switch S1, S2, may have a self-turn-off type semiconductor element and a diode inversely connected in parallel thereto, or a power MOSFET.

Because the voltages of the capacitor C1 and the capacitor C2 oscillate in the periods of gate control signals G1, G2 of the reverse-conductive type semiconductor switches S1, S2, protection again the overvoltage should be fast. When the capacitor voltage detected by the voltage detection unit 5 is going to exceed the threshold value, it is discharged through the current limiting discharge resistor 61 or the like, resulting in that the capacitor voltage stays at a value before exceeding the threshold value.

Figure 8B:
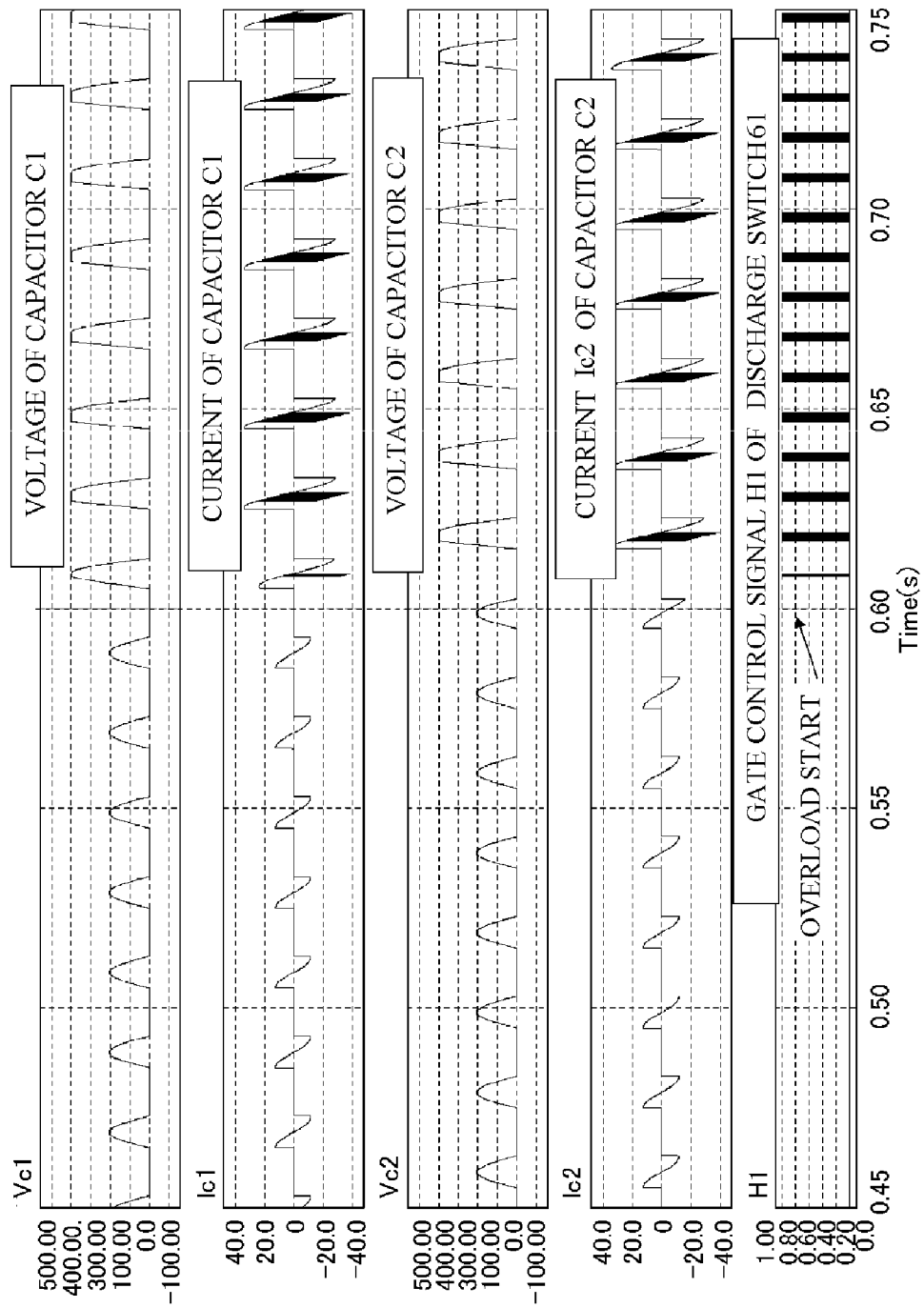
FIG. 8B is a waveform diagram showing results of simulation of the operation of the first embodiment of the protection circuit equipped magnetic energy recovery switch according to the invention.

FIGS. 8A and 8B show simulation results illustrating the operation of the protection circuit equipped magnetic energy recovery switch 100 having the protection circuit 10.

When the total voltage of the capacitor C1 and the capacitor C2 is going to exceed approximately 800 Vpp, the control means 4 turns on the discharge switch 62 to operate the discharge circuit 6 to discharge the current to the discharge resistor 61, thereby discharging the overvoltages of the capacitor C1 and the capacitor C2, so that the total voltage of the capacitor C1 and the capacitor C2 does not become 800 Vpp or higher. What is important is that the suppression of the total voltage of the capacitor C1 and the capacitor C2 results in suppression of the reactance voltage, so that rises of a load voltage Vout and a load current Iout are also suppressed due to the limitation of the total voltage of the capacitor C1 and the capacitor C2.

Figure 6B:
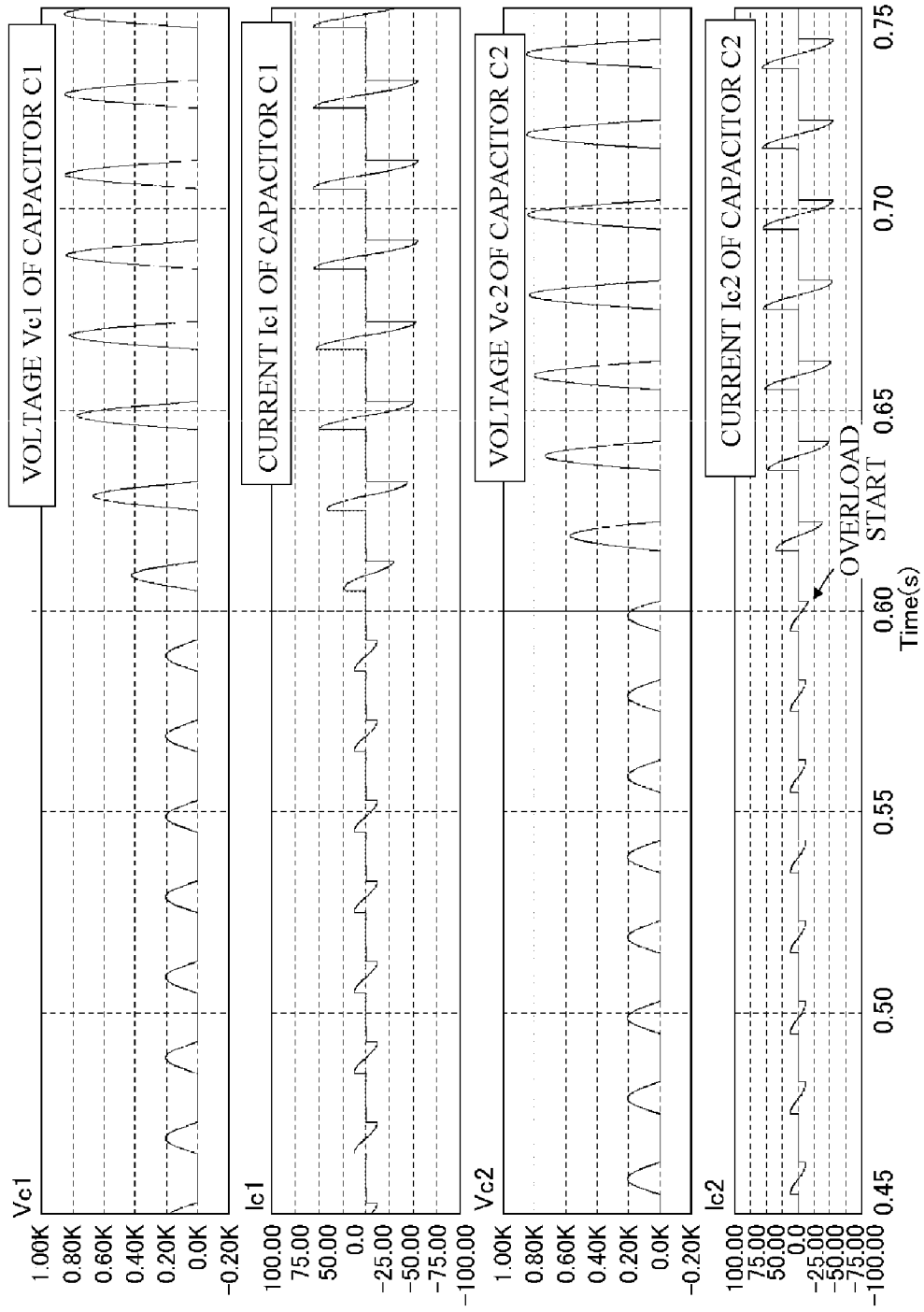
FIG. 6B is a waveform diagram showing results of simulation of the generation of an overvoltage and overcurrent in the conventional vertical half-bridge type magnetic energy recovery switch.

FIGS. 6A and 6B show simulation results illustrating the operation of the AC power supply unit 1a using the conventional vertical half-bridge type MERS which does not have the protection circuit 10.

After about 0.5 second after an overcurrent is generated when the resistive component R of the load 8 becomes a half by overload, the output voltage Vout rapidly rises from 100 Vrms to 240 Vrms and the total voltage of the capacitor C1 and the capacitor C2 rapidly rises from about 280 pp to about 1600 Vpp. As shown in FIGS. 8A and 8B, therefore, it is understood that the protection circuit equipped magnetic energy recovery switch 100 having the protection circuit 10 is effectively working.

It is the characteristic that although the voltages of the two capacitors rapidly rise when an overcurrent is generated in the vertical half-bridge type MERS, both of the overvoltage and overcurrent do not rise rapidly if the voltages of the capacitors are suppressed. This is essentially different from overvoltage protection for a capacitor used in a DC voltage source in the conventional voltage type inverter device.

As another approach in case of exceeding the withstand voltage of a capacitor or the withstand voltage of a reverse-conductive type semiconductor switch, the phase of the gate control signal of the vertical half-bridge type MERS may be further advanced to reduce shared voltage of the load. However, the control cycle of the phase of the gate control signal is a half cycle in synchronization with the frequency of the AC power supply, so that a change in the ON/OFF phase of the gate control signal which is close to the phase speed of the AC power supply makes the ON time of the gate of the reverse-conductive type semiconductor switch equal to or longer than the half cycle of the period of the AC power supply and generates a DC component in the load voltage, which is not favorable. It is necessary to put a time consonant of 10 mS or greater (when the frequency of the AC power supply is 50 Hz) in a change in the ON/OFF phase of the gate control signal. The result will appear one cycle after the period of the AC power supply. While the above control is sufficient in controlling a change in the output of the load, it does not fast enough for the protection operation because the current increasing speed of the overcurrent due to an accident or the like is faster than one cycle of the AC power supply.

Figure 9A:
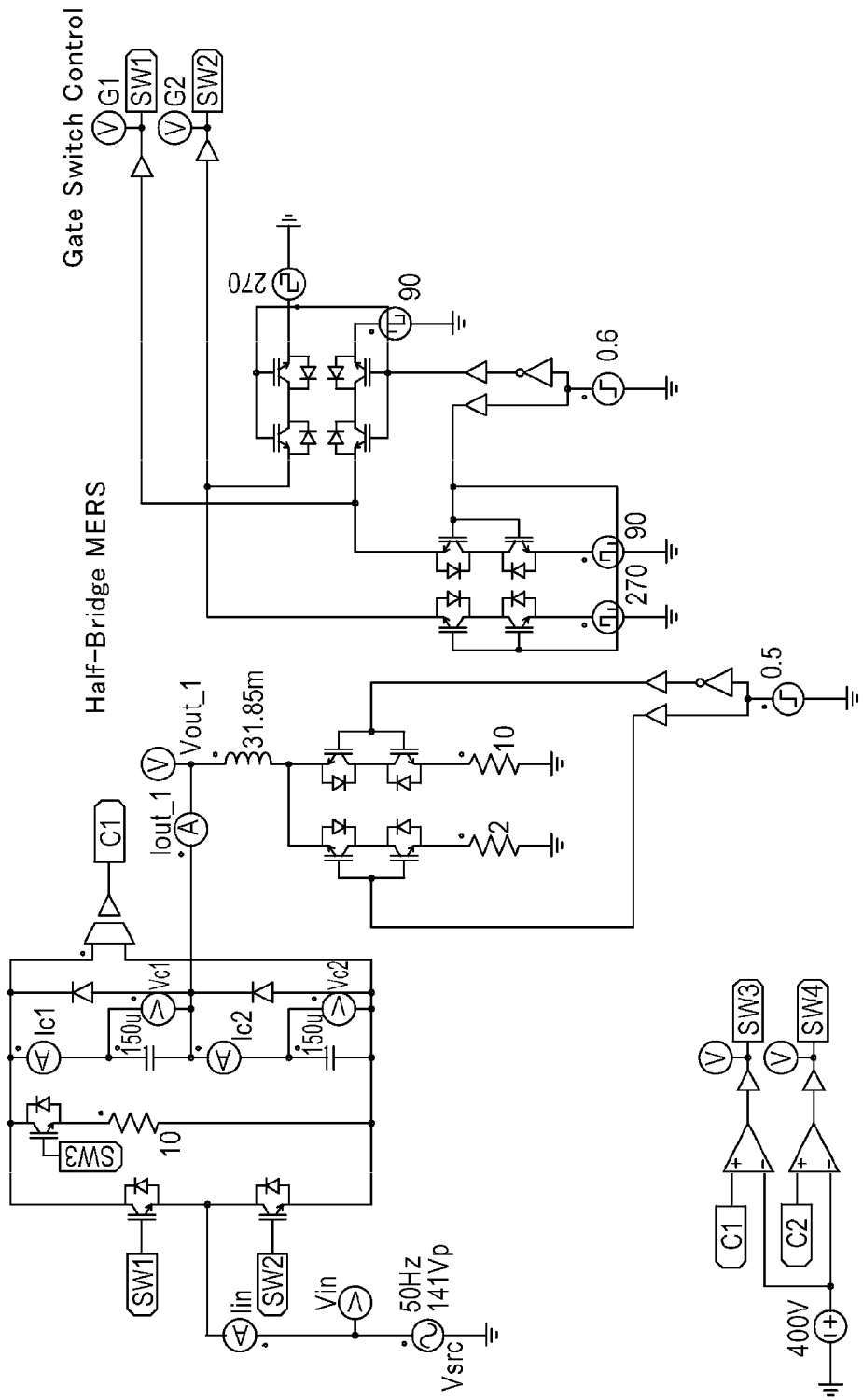
FIG. 9A is a diagram showing a circuit for executing another simulation of the operation of the first embodiment of the protection circuit equipped magnetic energy recovery switch according to the invention.

FIG. 9A is a circuit diagram for simulation to see a rapid change in the phase of the gate control signal and changes in capacitor voltage, load voltage and load current which are caused by reduction of the pulse width of the gate ON signal in the protection circuit equipped magnetic energy recovery switch 100 according to the first embodiment of the invention.

Figure 9B:
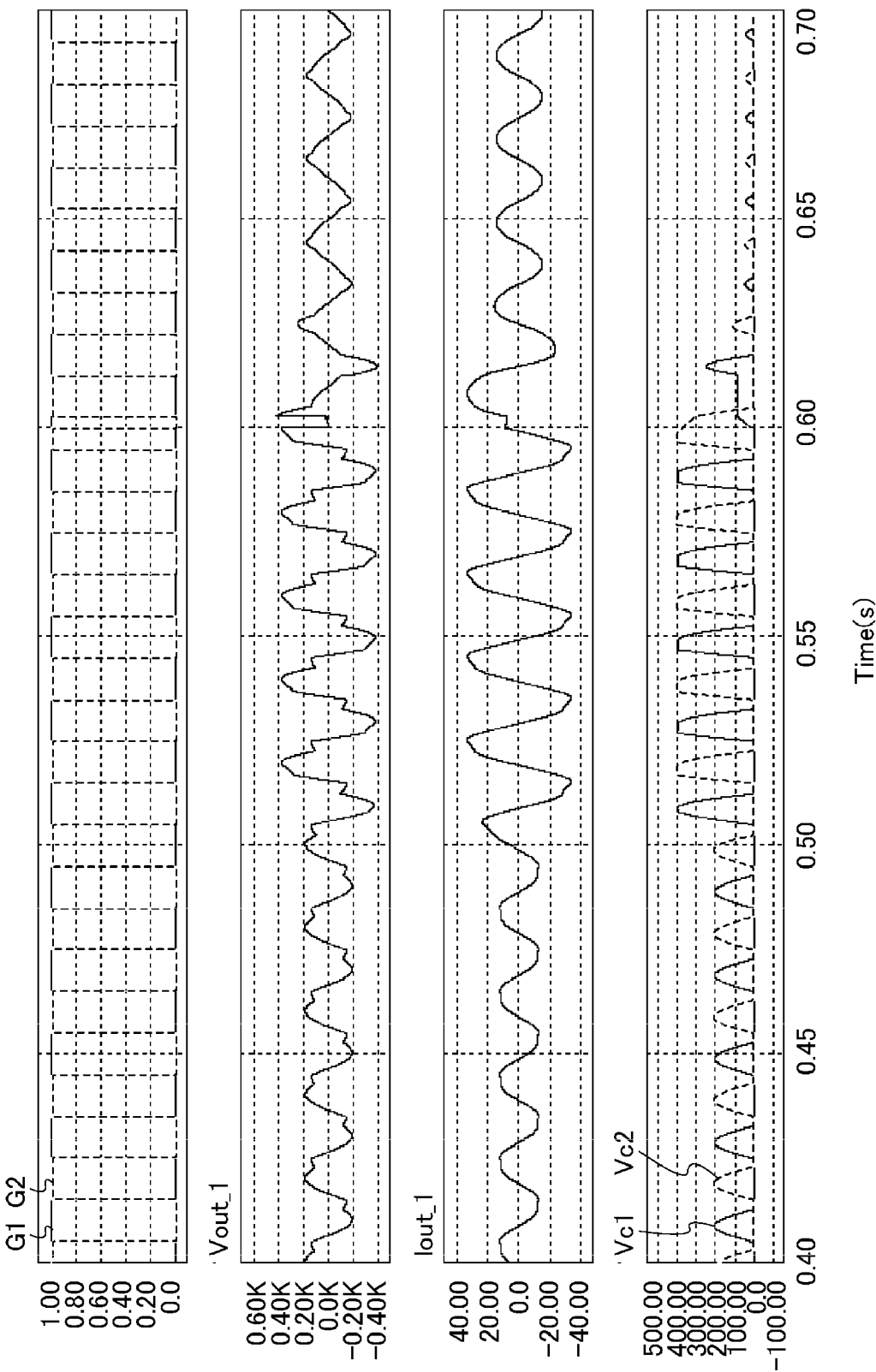
FIG. 9B is a waveform diagram showing results of another simulation of the operation of the first embodiment of the protection circuit equipped magnetic energy recovery switch according to the invention.

FIG. 9B shows results of simulation in case where the overvoltage of the load voltage and the overcurrent of the load current occur at time 0.50 second due to overload, and the phase of the gate signal is changed rapidly at time 0.60 second as a protection measure.

The waveform diagram of FIG. 9B shows the gate control signals, load (output) voltage, load (output) current, and capacitor voltages in order from the top. In this case, when the gate control signal lacks a pulse, the load (output) current is disturbed and DC current is output. It is therefore apparent that it is not fast enough to change the ON/OFF phase of the gate control signal in the direction of reducing the capacitor voltage when the output of the voltage detection unit 5 is input to the control means 4, and is compared with a predetermined value (threshold value) prestored in the control means 4, and when the output of the voltage detection unit 5 exceeds the threshold value, i.e., when the total voltage of the capacitor C1 and the capacitor C2 becomes an overvoltage.

In this respect, as a further preferable embodiment of the protection circuit of the present invention, a method of reducing the pulse width of the ON signal of the gate control signal, i.e., making the "duty ratio" of the gate control signal smaller than 0.5, may be taken. That is, as shown in FIG. 7, a current detection unit 7 may be interposed between the AC power supply unit 1a and the load 8 to detect a current flown across the load, and when the output of the current detection unit 7 exceeds a predetermined value, the control means 4 may perform current limiting control by making the ON/OFF "duty ratio" of the pulses in the gate control signals G1, G2 of the reverse-conductive type semiconductor switches S1, S2 smaller than 0.5.

Figure 10:
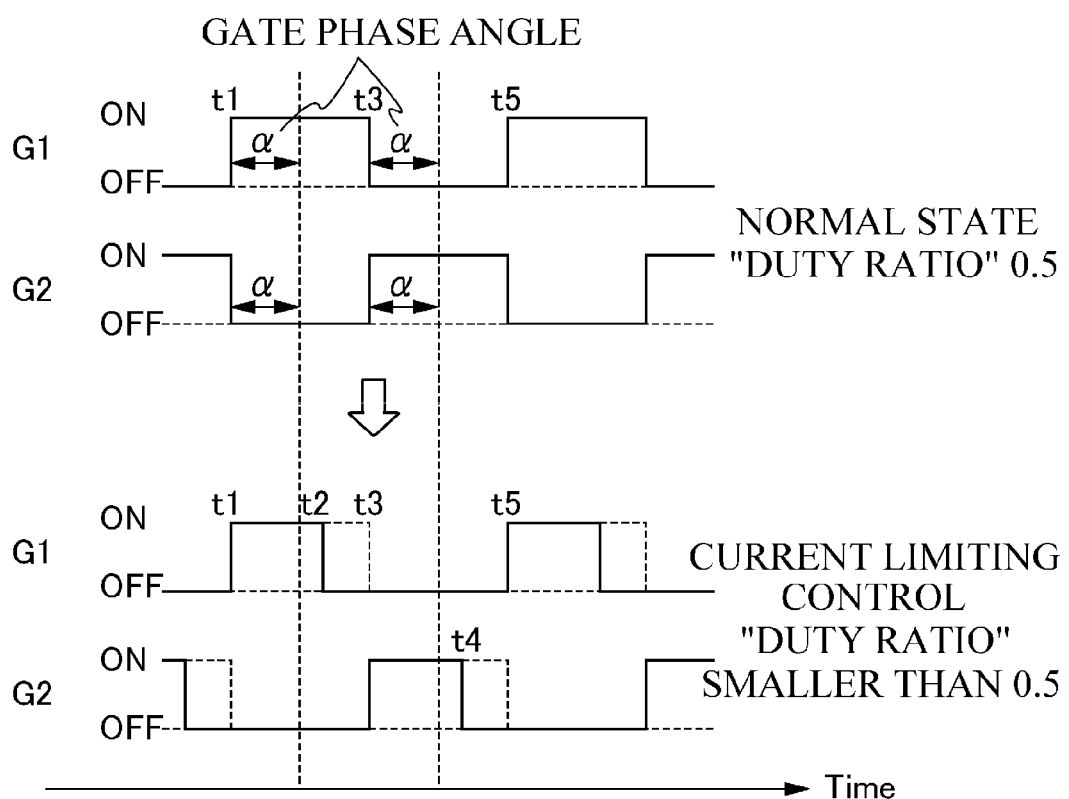
FIG. 10 is a diagram illustrating the duty ratio of a gate ON pulse in the first embodiment of the protection circuit equipped magnetic energy recovery switch according to the invention.

FIG. 10 is for explaining the ON/OFF "duty ratio". In the normal state or when the output of the current detection unit 7 is not over a predetermined value, the gate control signal G1 of the reverse-conductive type semiconductor switch S1 is turned ON at time t1, turned OFF at time t3 and turned ON again at t5, which is repeated thereafter. The gate control signal G2 of the reverse-conductive type semiconductor switch S2 is turned OFF at time t1, turned ON at time t3 and turned OFF again at t5, which is opposite to the action of the gate control signal G1 of the reverse-conductive type semiconductor switch S1. The ON/OFF switching timing of the gate control signal leads the timing for switching the phase of the polarity of the AC power supply by α degrees (i.e., the state of the ON/OFF phase α). With regard to the gate control signal G1 of the reverse-conductive type semiconductor switch S1, the ON time (from time t1 to time t3) is equal to the OFF time (from time t3 to time t5). That is, with regard to the gate control signal G2 of the reverse-conductive type semiconductor switch S2, the OFF time (from time t1 to time t3) is equal to the ON time (from time t3 to time t5). This is the state of the ON/OFF "duty ratio"=0.5.

When the ON/OFF "duty ratio" is made smaller than 0.5, as shown in FIG. 10, the gate control signal G1 of the reverse-conductive type semiconductor switch S1 is turned ON at time t1, turned OFF at time t2 (predetermined time before time t3) and turned ON again at t5, which is repeated thereafter. The gate control signal G2 of the reverse-conductive type semiconductor switch S2 is turned ON at time t3 and turned OFF again at t4 (predetermined time before time t5), which is opposite to the action of the gate control signal G1 of the reverse-conductive type semiconductor switch S1. Here, the ON time from time t2 to time t3 is deleted for the gate control signal G1 of the reverse-conductive type semiconductor switch S1, and the ON time from time t4 to time t5 is deleted for the gate control signal G2 of the reverse-conductive type semiconductor switch S2. That is, the pulse width of the ON signal is reduced.

The duration from time t2 to time t3 and the duration from time t4 to time t5 are a duration in which the gate control signal G1 of the reverse-conductive type semiconductor switch S1 and the gate control signal G2 of the reverse-conductive type semiconductor switch S2 are both OFF (hereinafter called "all-OFF duration"). The all-OFF duration is set at rear portions of the ON durations of the gate control signal G1 of the reverse-conductive type semiconductor switch S1 and the gate control signal G2 of the reverse-conductive type semiconductor switch S2 (rear portion of the ON duration is cut). The all-OFF duration may be set once in the ON duration, or may be provided by instantaneously disabling the gate which is enabled multiple times.

FIG. 9C shows results of simulation in case where the overvoltage of the load voltage and the overcurrent of the load current occur at time 0.50 second due to overload, and the pulse width of the ON signal is reduced rapidly from "duty ratio"=0.5 at time 0.60 second as a protection measure.

The waveform diagram of FIG. 9C shows the gate control signals, load (output) voltage, load (output) current, and capacitor voltages in order from the top. It is apparent that even if the pulse width of the ON signal of the gate control signal is reduced, the current is reduced without disturbance in the current waveform.

Specifically, the control means 4 reduces the pulse width of the ON signal of the gate control signal G1, G2 of the reverse-conductive type semiconductor switch S1, S2 with an overvoltage signal upon detection of an overvoltage or with an overcurrent signal upon detection of an overcurrent. Accordingly, the rise in load voltage stops, and the load current is decreased to or below the overcurrent protection level under the current feedback control. The overvoltages of the capacitor C1 and the capacitor C2 are likewise lowered below the protection level. Because the effect of the current feedback control based on the control on the duty ratio of the gate control signal does not appear instantaneously, it is desirable to combine the control with discharge of electric charge of the capacitor by means of the discharge switch 62. In addition, it is desirable to fix the ON/OFF phase unchanged at the time of executing the current feedback control based on the duty ratio control on the gate control signal and/or discharge with the discharge switch 62.

When the load current exceeds the threshold value, the current feedback control based on the duty ratio control on the gate control signal makes the gate-OFF time of the reverse-conductive type semiconductor switch S1, S2 longer (pulse width of the ON signal narrower). That is, the reverse-conductive type semiconductor switches S1, S2 work as a current limiter. Therefore, the vertical half-bridge type MERS itself can be operated as a current limiter.

As apparent from the above, the overvoltage protecting function by cutting the peaks of the voltages of the capacitor C1 and the capacitor C2 and the current limiting function based on the duty ratio control on the gate control signals G1, G2 of the reverse-conductive type semiconductor switches S1, S2 are available as the method of protecting the vertical half-bridge type MERS. One of the functions may be used or they may be combined. In case of the combination, the protecting function for the vertical half-bridge type MERS is further enhanced.

The configuration may be made to control the gate control signals G1, G2 in such a way that when the duration in which the output of the voltage detection unit 5 exceeds a predetermined value exceeds a predetermined time, the reverse-conductive type semiconductor switches S1, S2 are both turned off to cut off the current.

The configuration may be made to control the gate control signals G1, G2 in such a way that when the duration in which the output of the voltage detection unit 5 exceeds a predetermined value exceeds a predetermined time, the gate of the discharge switch is controlled so that the electric charges of the capacitor C1 and the capacitor C2 are discharged to have a voltage of zero, after which the reverse-conductive type semiconductor switches S1, S2 are both turned on to set the current conductive in both directions.

Second Embodiment

Next, a protection circuit equipped magnetic energy recovery switch according to the second embodiment will be described.

Figure 11:
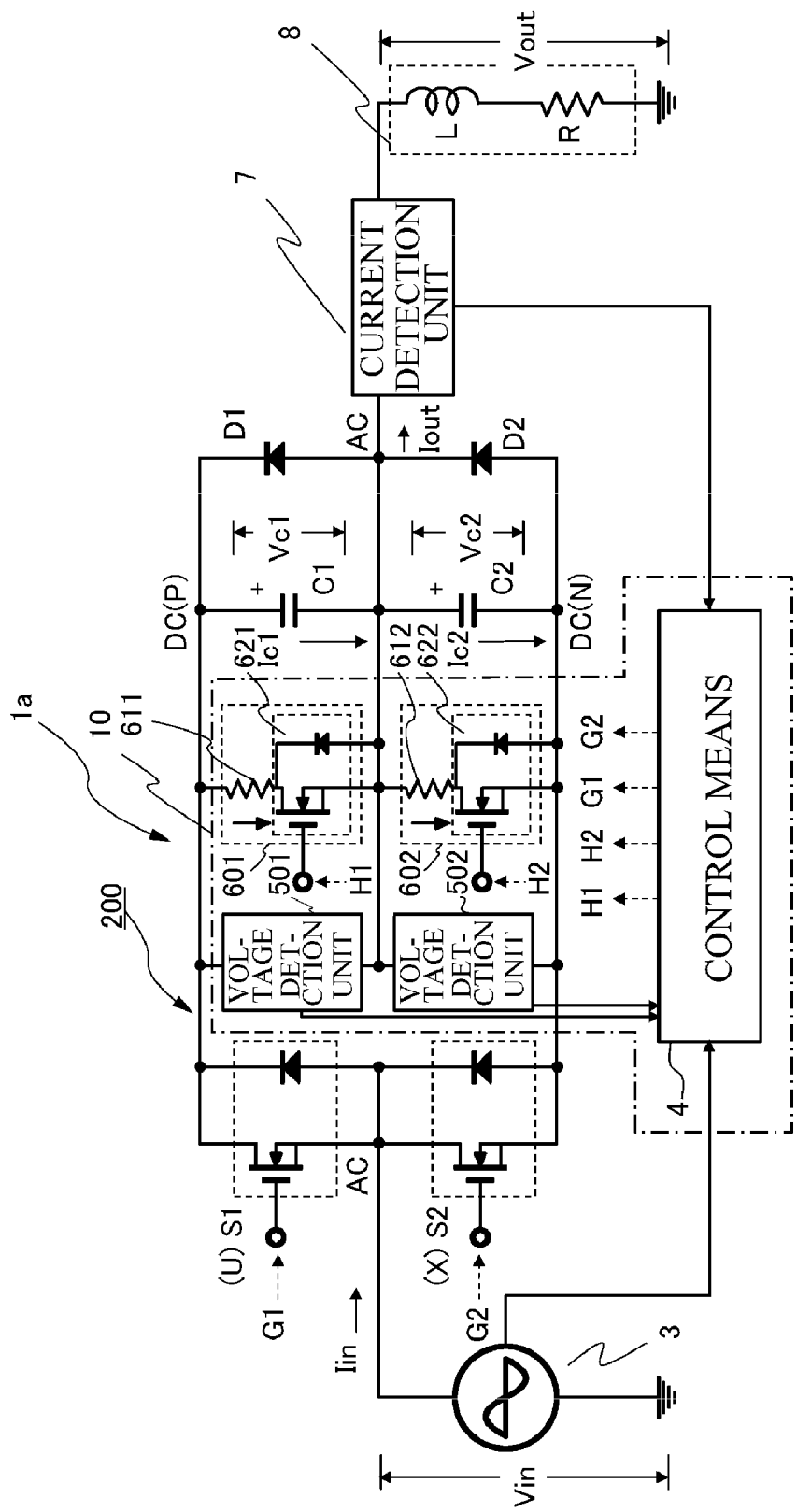
FIG. 11 is a circuit block diagram showing a second embodiment of a protection circuit equipped magnetic energy recovery switch according to the invention.

FIG. 11 is a circuit block diagram showing the configuration of a protection circuit equipped magnetic energy recovery switch 200 according to the second embodiment of the invention.

This protection circuit equipped magnetic energy recovery switch 200 relates to a protection circuit equipped magnetic energy recovery switch having a protection circuit to protect an AC power supply unit 1a using a vertical half-bridge type MERS shown in FIG. 2 against an overvoltage and/or overcurrent.

In the second embodiment of the invention, two discharge circuits and two voltage detection units corresponding to the capacitor C1 and the capacitor C2 are provided as a protection circuit.

More specifically, a first discharge circuit 601 is connected in parallel to the capacitor C1, a second discharge circuit 602 is connected in parallel to the capacitor C2, a first voltage detection unit 501 is connected in parallel to the capacitor C1 and the first discharge circuit 601, and a second voltage detection unit 502 is connected in parallel to the capacitor C2 and the second discharge circuit 602.

The first discharge circuit 601 has a discharge resistor 611 and a discharge switch 621 connected in series to each other, and the second discharge circuit 602 has a discharge resistor 612 and a discharge switch 622 connected in series to each other. The ON/OFF of each discharge switch 621, 622 is controlled by the gate control signal H1, H2 supplied from the control means 4. That is, when the output of the voltage detection unit 501 is input to the control means 4, and is compared with a predetermined value (threshold value) prestored in the control means 4, and when the output of the voltage detection unit 501 exceeds the threshold value, i.e., when the voltage of the capacitor C1 becomes an overvoltage, the control means 4 sends the gate control signal H1 to enable the gate of the discharge switch 621 to short-circuit the discharge switch 621 to discharge the electric charge of the capacitor C1 through the discharge resistor 611, thereby dropping the capacitor voltage. When the capacitor voltage returns to the normal range, the control means 4 sends the gate control signal H1 to disable the gate of the discharge switch 621, turning off the discharge switch 621.

Likewise, when the output of the voltage detection unit 502 is input to the control means 4, and is compared with the predetermined value (threshold value) prestored in the control means 4, and when the output of the voltage detection unit 502 exceeds the threshold value, i.e., when the voltage of the capacitor C2 becomes an overvoltage, the control means 4 sends the gate control signal H2 to enable the gate of the discharge switch 622 to short-circuit the discharge switch 622 to discharge the electric charge of the capacitor C2 through the discharge resistor 612, thereby dropping the capacitor C2 voltage. When the capacitor C2 voltage returns to the normal range, the control means 4 sends the gate control signal H2 to disable the discharge switch 622, turning off the discharge switch 622.

According to the second embodiment of the invention, as apparent from the above, it is possible to individually detect the voltages of the capacitor C1 and the capacitor C2 of the vertical half-bridge type MERS by means of the voltage detection unit 501 and the voltage detection unit 502, to thereby individually protect the capacitor C1 and the capacitor C2.

Further, as shown in FIG. 11, the current detection unit 7 may be interposed between the AC power supply unit 1a and the load 8 to detect the current flowing across the load 8, and current limiting control may be carried out in such a way that when the output of the current detection unit 7 exceeds a predetermined value, the control means 4 makes the ON/OFF "duty ratio" of the pulses of the gate control signals G1, G2 of the reverse-conductive type semiconductor switches S1, S2 smaller than 0.5. The mode of the "duty ratio" is similar to the one described in the description of the protection circuit equipped magnetic energy recovery switch 100 according to the first embodiment of the invention.

The configuration may be made to control the gate control signals G1, G2 in such a way that when the duration in which the output of the voltage detection unit 501, 502 exceeds a predetermined value exceeds a predetermined time, the reverse-conductive type semiconductor switches S1, S2 are both turned off to cut off the current.

In addition, the configuration may be made to control the gate control signals G1, G2 in such a way that when the duration in which the output of the voltage detection unit 501, 502 exceeds a predetermined value exceeds a predetermined time, the gate H1, H2 of the discharge switch 621, 622 is controlled so that the electric charges of the capacitor C1 and the capacitor C2 are discharged to have a voltage of zero, after which the reverse-conductive type semiconductor switches S1, S2 are both turned on to set the current conductive in both directions.

Third Embodiment

Next, a protection circuit equipped magnetic energy recovery switch according to the third embodiment will be described.

Figure 12:
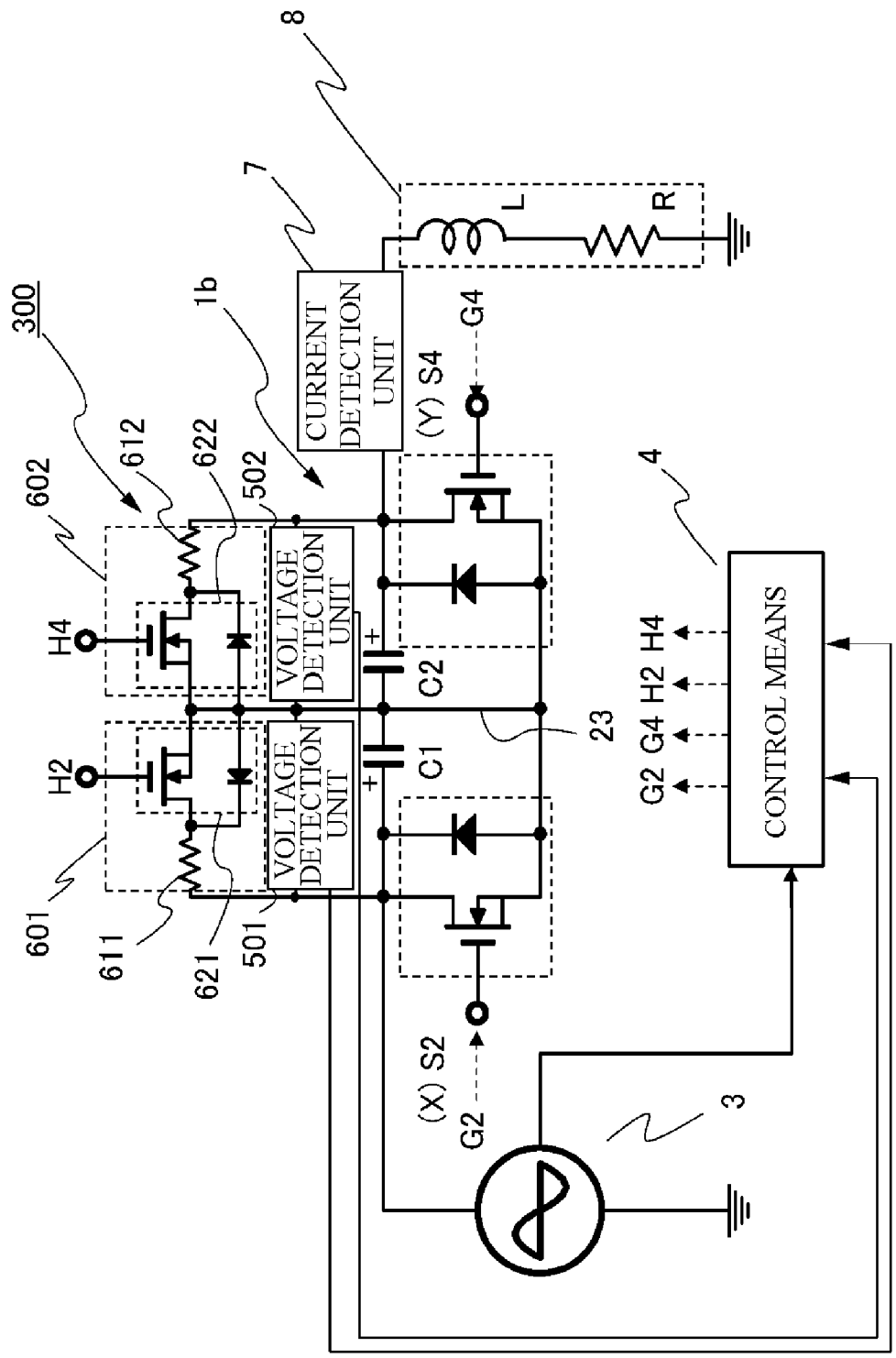
FIG. 12 is a circuit block diagram showing a third embodiment of a protection circuit equipped magnetic energy recovery switch according to the invention.

FIG. 12 is a circuit block diagram showing the configuration of a protection circuit equipped magnetic energy recovery switch 300 according to the third embodiment of the invention.

Figure 4:
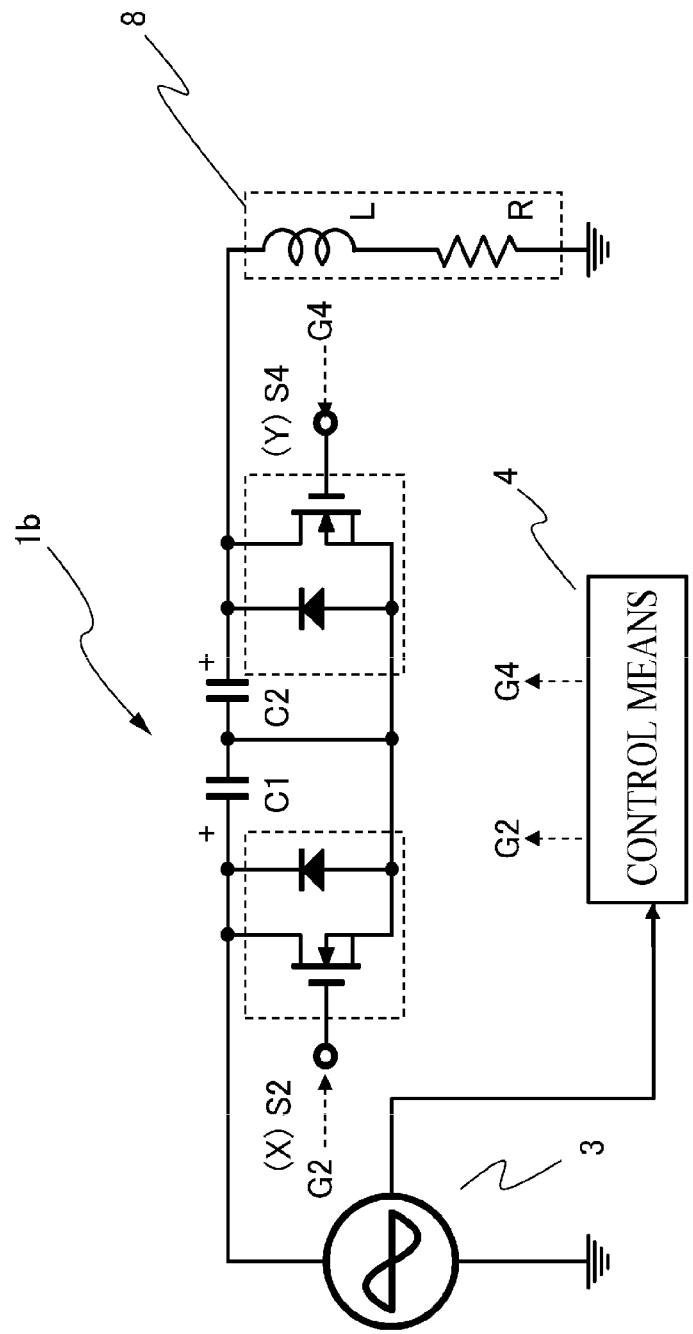
FIG. 4 shows an AC power supply unit using a conventional horizontal half-bridge type magnetic energy recovery switch.
Figure 5A:
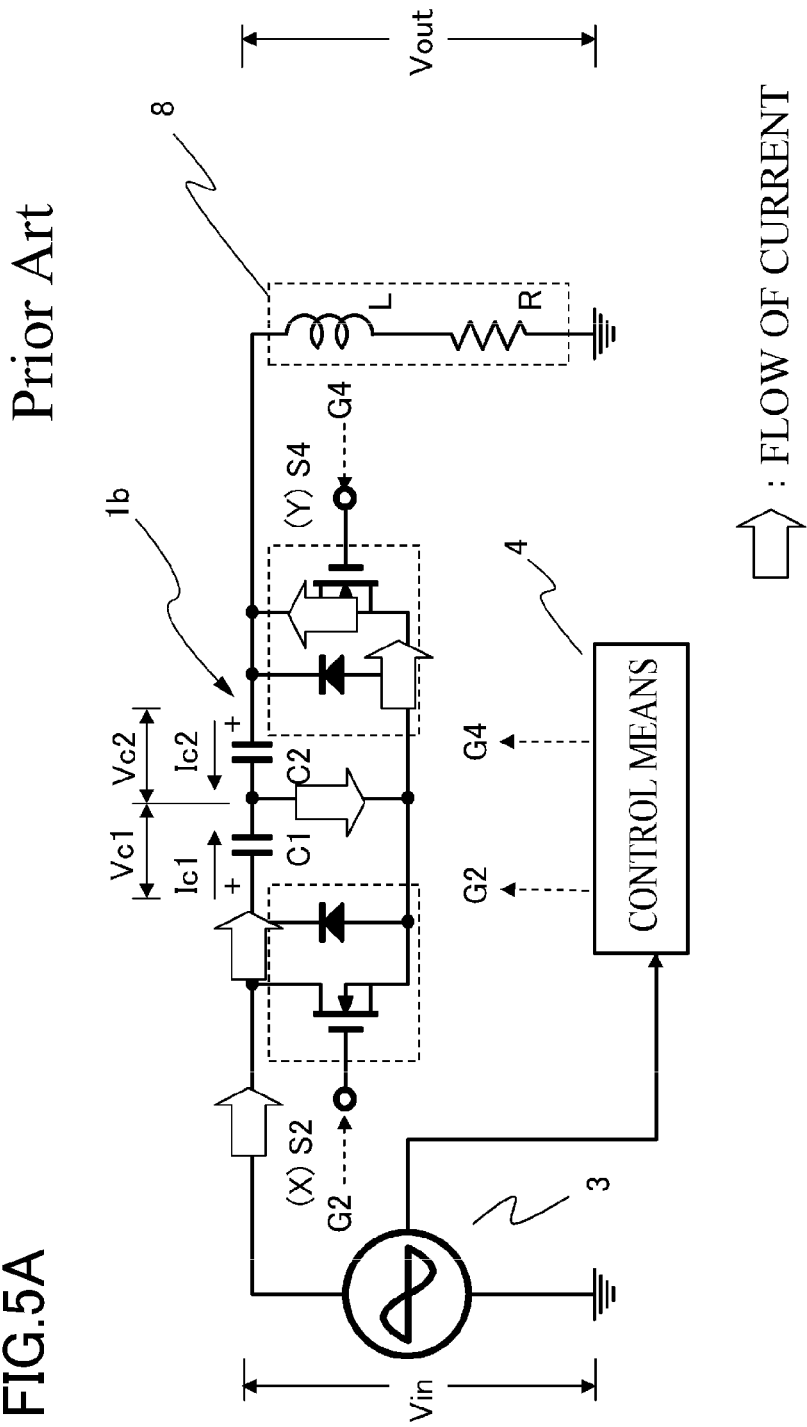
FIG. 5A is a diagram showing the flow of the current of the AC power supply unit using the conventional horizontal half-bridge type magnetic energy recovery switch.

This protection circuit equipped magnetic energy recovery switch 300 relates to a protection circuit equipped magnetic energy recovery switch having a protection circuit to protect an AC power supply unit 1b using a horizontal half-bridge type MERS shown in FIG. 4 against an overvoltage and/or overcurrent.

More specifically, as shown in FIG. 12, the protection circuit equipped magnetic energy recovery switch 300 has two inversely series-connected reverse-conductive type semiconductor switches S2, S4, series connection of a first capacitor C1 and second capacitor C2 connected in parallel to the reverse-conductive type semiconductor switches S2, S4, a wiring 23 connecting an intermediate node between the two reverse-conductive type semiconductor switches S1 and S2 and an intermediate node between the first capacitor C1 and the second capacitor C2, and control means 4 which controls the phases of gate control signals G2, G4 in such a way as to alternately perform ON/OFF control on the reverse-conductive type semiconductor switches in synchronization with the frequency of the AC power supply. The AC power supply 3 is connected to the connection node between the reverse-conductive type semiconductor switch S2 and the capacitor C1, and the load 8 is connected to the connection node between the reverse-conductive type semiconductor switch S4 and the capacitor C2 via the current detection unit 7.

In the third embodiment of the invention, the first discharge circuit 601 and C1 are connected in parallel to each other, the second discharge circuit 602 and the capacitor 22 are connected in parallel to each other, the first voltage detection unit 501 is connected in parallel to the capacitor 21 and the first discharge circuit 601, and the second voltage detection unit 502 is connected in parallel to the capacitor 22 and the second discharge circuit 602.

The first discharge circuit 601 has the discharge resistor 611 and the discharge switch 621 connected in series to each other, and the second discharge circuit 602 has the discharge resistor 612 and the discharge switch 622 connected in series to each other. The ON/OFF of each discharge switch 621, 622 is controlled by a gate control signal H2, H4 supplied from the control means 4.

That is, when the output of the voltage detection unit 501 is input to the control means 4, and is compared with a predetermined value (threshold value) prestored in the control means 4, and when the output of the voltage detection unit 501 exceeds the threshold value, i.e., when the voltage of the capacitor C1 becomes an overvoltage, the control means 4 sends the gate control signal H2 to enable the gate of the discharge switch 621 to short-circuit the discharge switch 621 to discharge the electric charge of the capacitor C1 through the discharge resistor 611, thereby dropping the capacitor C1 voltage. When the capacitor C1 voltage returns to the normal range, the control means 4 sends the gate control signal H2 to disable the gate of the discharge switch 621, turning off the discharge switch 621.

Likewise, when the output of the voltage detection unit 502 is input to the control means 4, and is compared with the predetermined value (threshold value) prestored in the control means 4, and when the output of the voltage detection unit 502 exceeds the threshold value, i.e., when the voltage of the capacitor C2 becomes an overvoltage, the control means 4 sends the gate control signal H4 to enable the gate of the discharge switch 622 to short-circuit the discharge switch 622 to discharge the electric charge of the capacitor C2 through the discharge resistor 612, thereby dropping the capacitor C2 voltage. When the capacitor C2 voltage returns to the normal range, the control means 4 sends the gate control signal H4 to disable the discharge switch 622, turning off the discharge switch 622.

According to the third embodiment of the invention, as apparent from the above, it is possible to individually protect the capacitor C1 and the capacitor C2 by individually detecting the voltages of the capacitor C1 and the capacitor C2 of the horizontal half-bridge type MERS by means of the voltage detection unit 501 and the voltage detection unit 502.

Further, as shown in FIG. 12, the current detection unit 7 may be interposed between the AC power supply unit 1b and the load 8 to detect the current flowing across the load 8, and current limiting control may be carried out in such a way that when the output of the current detection unit 7 exceeds a predetermined value, the control means 4 makes the ON/OFF "duty ratio" of the pulses of the gate control signals G2, G4 of the reverse-conductive type semiconductor switches S2, S4 smaller than 0.5. The mode of the "duty ratio" is similar to the one described in the description of the protection circuit equipped magnetic energy recovery switch 100 according to the first embodiment of the invention.

Figure 13A:
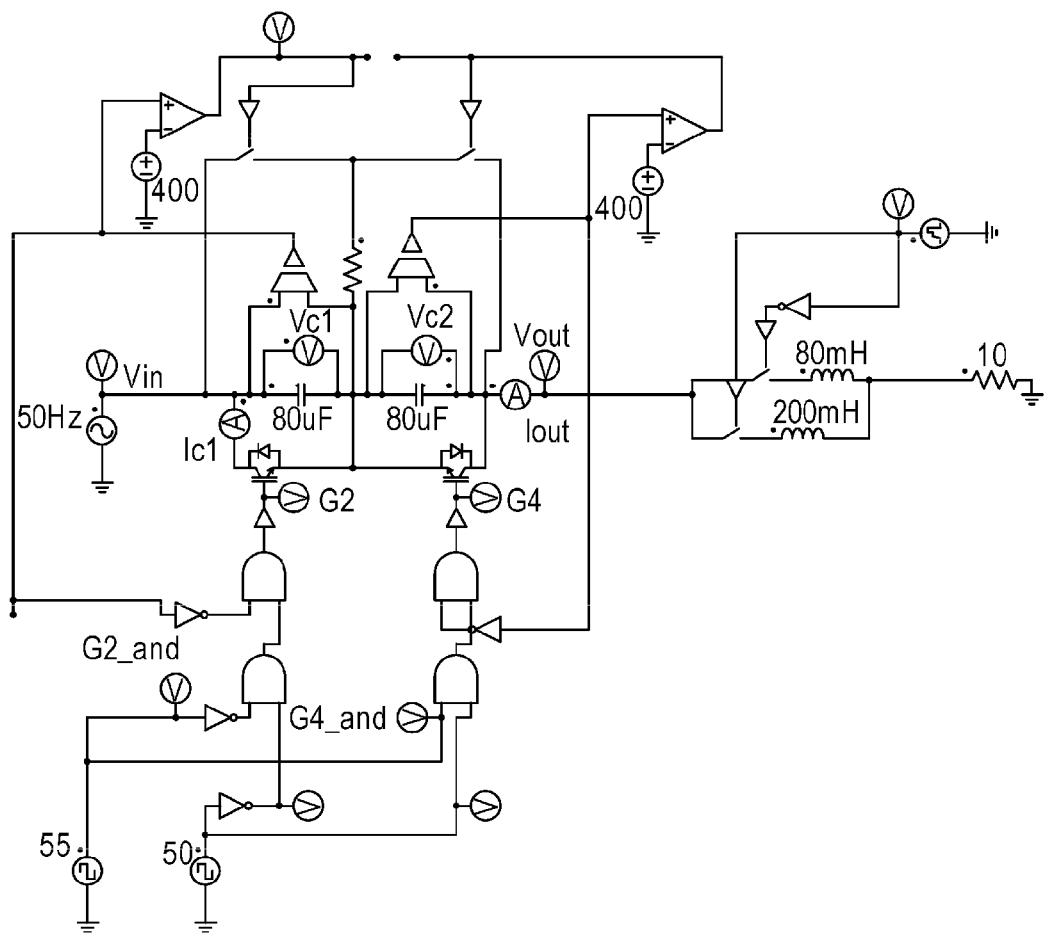
FIG. 13A is a diagram showing a circuit for executing simulation of the operation of the third embodiment of the protection circuit equipped magnetic energy recovery switch according to the invention.

FIG. 13A is a circuit diagram for simulation to see changes in capacitor voltage, load (output) voltage and load (output) current which are caused by reduction of the pulse width of the gate ON signal in the overvoltage protection circuit in the protection circuit equipped magnetic energy recovery switch 300 according to the third embodiment of the invention.

FIG. 13B shows results of simulation of changes in load (output) voltage and load (output) current in case where the overvoltage is discharged by the discharge circuit, when the overvoltage of the load voltage and the overcurrent of the load current occur between time 0.20 second and time 0.50 second due to overload, and at the same time, when the capacitors C1, C2 show voltages equal to or higher than a predetermined voltage.

The waveform diagram of FIG. 13B shows the gate control signals, load (output) voltage, capacitor voltages, load (output) current and the gate control signals in the discharge circuits in order from the top. It is apparent that in case where the capacitor C1 and the capacitor C2 show voltages equal to or higher than a predetermined voltage, the discharge switches 621, 622 discharge the overvoltages of the capacitor C1 and the capacitor C2, so that the voltages of the capacitor C1 and the capacitor C2 are suppressed to approximately 400 Vpp, resulting in suppression of significant increases in load voltage Vout and load current Iout.

Figure 13C:
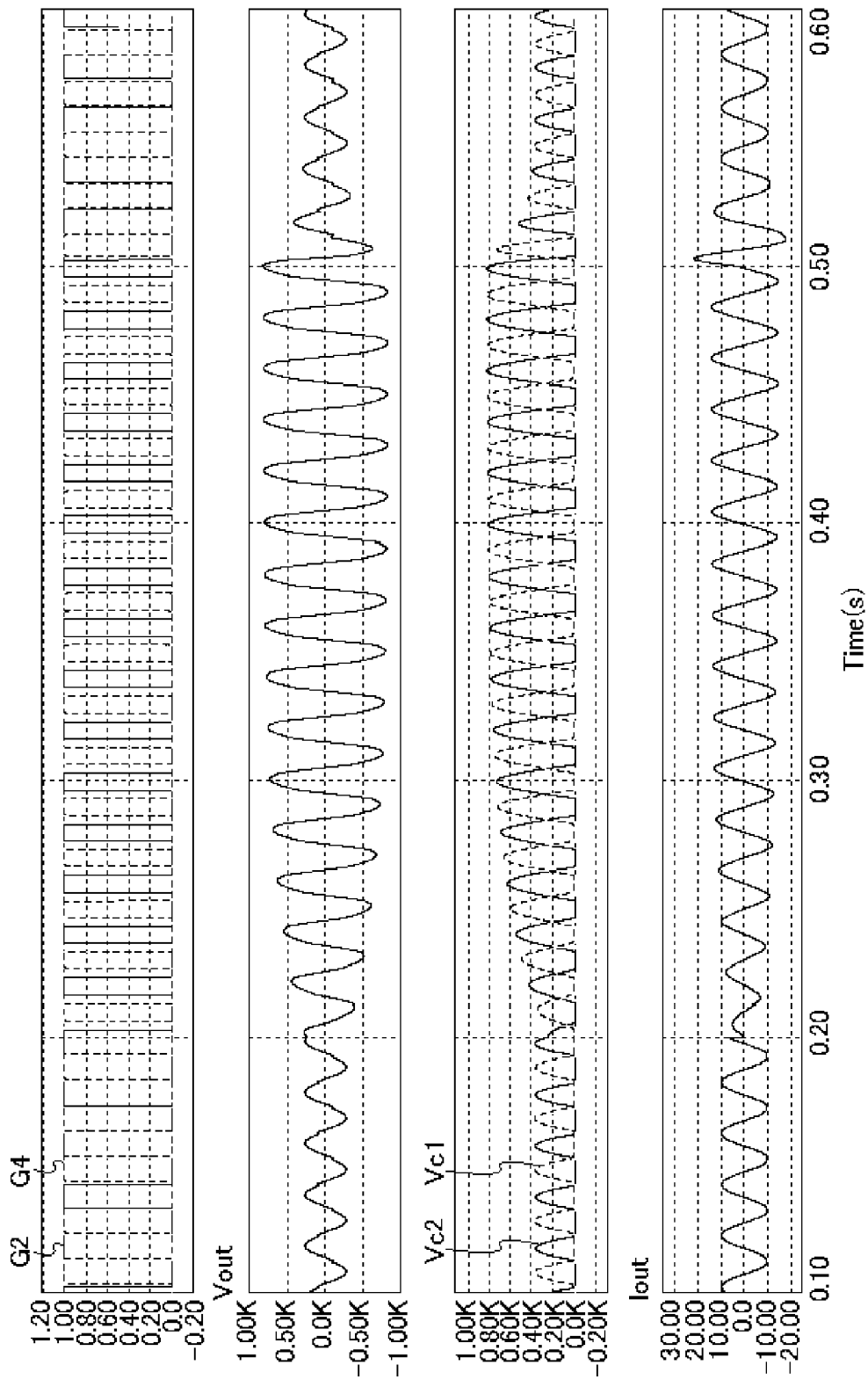
FIG. 13C is a waveform diagram showing results of simulation of the operation of the third embodiment of the protection circuit equipped magnetic energy recovery switch according to the invention.

FIG. 13C shows results of simulation of changes in load (output) voltage and load (output) current in case of taking a measure of not disabling the gate G4 of the gates G2, S4 of the reverse-conductive type semiconductor switch S2 when the overvoltage of the load voltage and the overcurrent of the load current occur between time 0.20 second and time 0.50 second due to overload, and at the same time, when the voltages of the capacitors C1, C2 are not zero.

The waveform diagram of FIG. 13C shows the gate control signals, load (output) voltage, capacitor voltages, and load (output) current in order from the top. At the time of switching ON/OFF the reverse-conductive type semiconductor switches S2, S4, if the voltage of the capacitor connected in parallel to the reverse-conductive type semiconductor switch is not zero, the control means 4 keeps the previous state (state where the reverse-conductive type semiconductor switch is OFF) until the voltage of the capacitor becomes zero, and supplies the gate control signal to turn on the reverse-conductive type semiconductor switch on when the voltage of the capacitor becomes zero. Therefore, short-circuit discharge does not occur in the capacitor C1 and the capacitor C2.

The pulse waveforms of the gate control signals G2, G4 do not enable the gates G2, G4 when the voltages of the capacitors C1, C2 are not zero even in the duration where the gates G2, G4 of the reverse-conductive type semiconductor switches are ON. This is equivalent to reducing the pulse widths of the pulse ON signals of the gate control signals G2, G4 of the reverse-conductive type semiconductor switches S2, S4, so that the "duty ratio" is smaller than 0.5.

Therefore, even in the protection circuit equipped magnetic energy recovery switch 300 according to the third embodiment of the invention, to protect the capacitors C1, C2, it is effective to reduce the pulse widths of the pulse ON signals of the gate control signals G2, G4 of the reverse-conductive type semiconductor switches S2, S4, thereby making the "duty ratio" smaller than 0.5. The all-OFF duration is set at front portions of the ON durations of the gate control signal G1 of the reverse-conductive type semiconductor switch S1 and the gate control signal G2 of the reverse-conductive type semiconductor switch S2 (first portion of the ON duration is cut).

Although the all-OFF duration is set by restriction of inhibiting the gate control signals G2, G4 of the reverse-conductive type semiconductor switches S2, S4 from being enabled when the voltages of the capacitor C1 and the capacitor C2 are not zero, the all-OFF duration may be set in consideration of the times of discharging the capacitor C1 and the capacitor C2.

As described above, the overvoltage protecting function by cutting the peaks of the voltages of the capacitor C1 and the capacitor C2 and the current limiting function based on the duty ratio control on the gate control signals G2, G4 of the reverse-conductive type semiconductor switches S2, S4 are available as the method of protecting the horizontal half-bridge type MERS. One of the functions may be used or they may be combined. In case of the combination, the protecting function for the horizontal half-bridge type MERS is further enhanced.

Figure 13D:
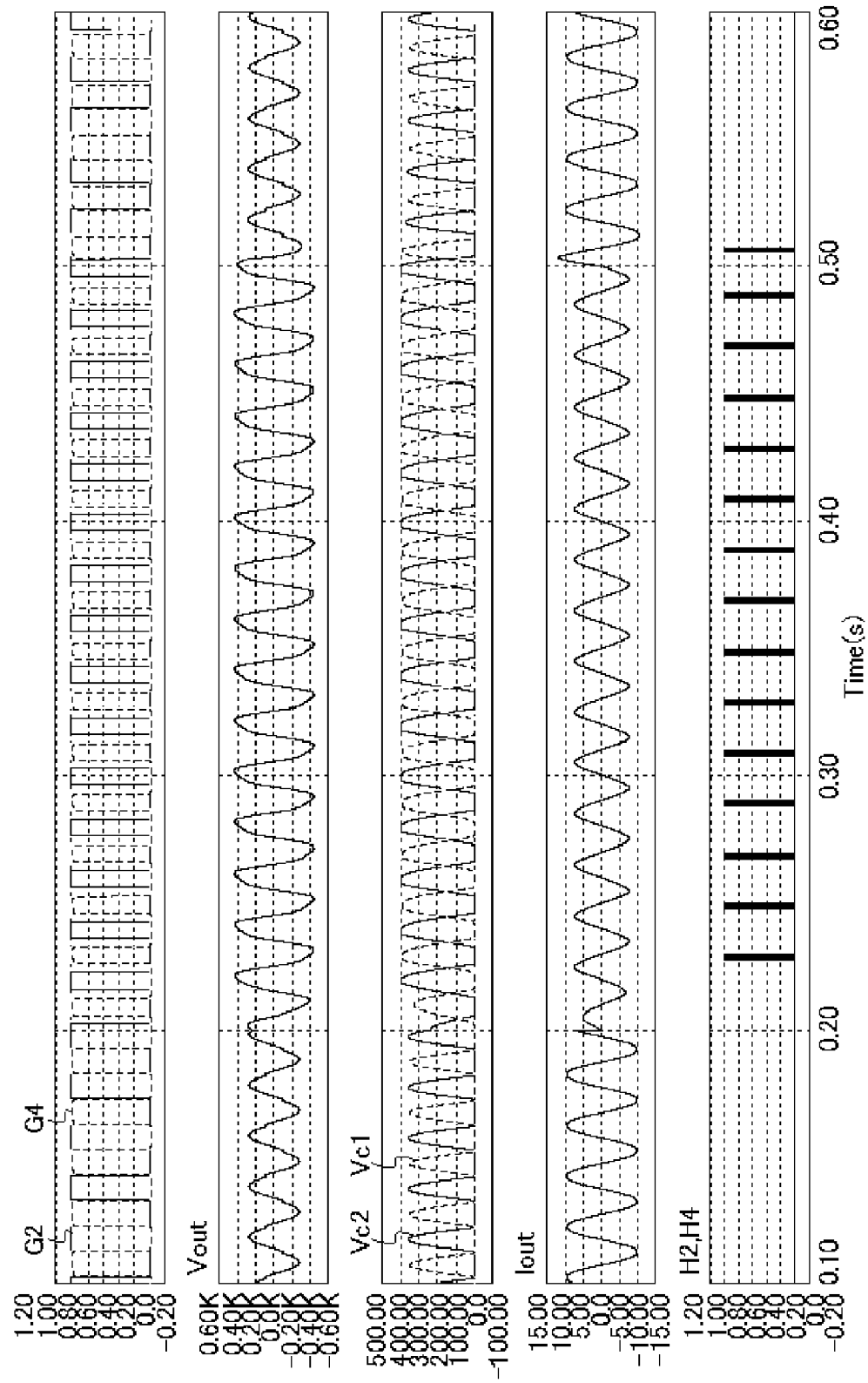
FIG. 13D is a waveform diagram showing results of simulation of the operation of the third embodiment of the protection circuit equipped magnetic energy recovery switch according to the invention.

FIG. 13D shows results of simulation in case a measure of not enabling the gates G2, G4 and a measure of discharging the overvoltage using the discharge circuit are both carried out when the overvoltage of the load voltage and the overcurrent of the load current occur between time 0.20 second and time 0.50 second due to overload, and at the same time, when the voltages of the capacitor C1 and the capacitor C2 are not zero.

The waveform diagram of FIG. 13D shows the gate control signals, load (output) voltage, capacitor voltages, load (output) current and the gate control signals in the discharge circuits in order from the top. It is apparent that in this case too, the voltages of the capacitor C1 and the capacitor C2 are suppressed to approximately 400 Vpp, and significant increases in load voltage Vout and load current Iout are suppressed. Further, the load (output) current less than that in the steady state is supplied, showing a greater effect of current limiting control.

Even in the protection circuit equipped magnetic energy recovery switch 300 according to the third embodiment of the invention, it is desirable, at the time of executing the current feedback control based on the duty ratio control on the gate pulse and/or discharge with the discharge switches 621, 622, to fix the ON/OFF phase unchanged.

The configuration may be made to control the gate control signals G2, G4 in such a way that when the duration in which the output of the voltage detection unit 501, 502 exceeds a predetermined value exceeds a predetermined time, the gate H2, H4 of the discharge switch 621, 622 is controlled so that the electric charges of the capacitor C1 and the capacitor C2 are discharged to have a voltage of zero, after which the reverse-conductive type semiconductor switches S2, S4 are both turned on to set the current conductive in both directions.

It is to be noted that the invention is not limited to the foregoing embodiment, are to be considered as illustrative and not restrictive and the invention is not to be limited to the details given herein, and modifications, such as various design changes, may be made based on the knowledge of those skilled in the art, and embodiments having such modifications made thereto are included within the scope of the invention.

The invention claimed is:

1. A protection circuit equipped magnetic energy recovery switch comprising:
a magnetic energy recovery switch, interposed between an AC power supply and a load, for storing magnetic energy of a current, and recovering the magnetic energy to the load; and
protection means for protecting the magnetic energy recovery switch against an overvoltage or an overcurrent,
wherein the magnetic energy recovery switch includes a bridge circuit having two series-connected reverse-conductive type semiconductor switches and two series-connected diodes, two series-connected capacitors respectively connected in parallel to the two series-connected diodes, and control means that controls phases of gate control signals for the reverse-conductive type semiconductor switches in such a way as to alternately perform ON/OFF control on the reverse-conductive type semiconductor switches in synchronization with a frequency of the AC power supply,
wherein the protection means includes a voltage detection unit connected between DC terminals of the bridge circuit to detect a voltage across the two series-connected capacitors, a discharge circuit connected between the DC terminals of the bridge circuit and having a discharge resistor and a discharge switch connected in series to each other, and a current detection unit, interposed between the AC power supply and the load, for detecting a current which flows across the load, and
wherein the control means controls a gate of the discharge switch so as to short-circuit the discharge switch when an output of the voltage detection unit exceeds a predetermined voltage value, thereby discharging electric charges of the capacitors through the discharge resistor, and performs current limiting control by making a duty ratio of an ON pulse of the gate control signals of the reverse-conductive type semiconductor switches smaller than 0.5 when the output of the current detection unit exceeds a predetermined current value.

2. The protection circuit equipped magnetic energy recovery switch according to claim 1, wherein when the output of the current detection unit returns to the predetermined value, the control means sets back the duty ratio of the ON/OFF pulse of the gate control signal of the reverse-conductive type semiconductor switch to 0.5 and terminates current limiting control.

3. The protection circuit equipped magnetic energy recovery switch according to claim 1, wherein when a period of time during which the output of the voltage detection unit is greater than the predetermined voltage value exceeds a predetermined time, the control means controls gates of the reverse-conductive type semiconductor switches so as to turn off all the reverse-conductive type semiconductor switches to cut off the current.

4. The protection circuit equipped magnetic energy recovery switch according to claim 1, wherein when a period of time during which the output of the voltage detection unit is greater than the predetermined voltage value exceeds a predetermined time, the control means controls the gate of the discharge switch so as to discharge electric charges of the two capacitors to set the voltage to substantially zero, and then controls gates of the reverse-conductive type semiconductor switches so as to turn on all the reverse-conductive type semiconductor switches so that the current becomes conductive in both directions.

5. The protection circuit equipped magnetic energy recovery switch according to claim 1, wherein the control means controls gates of the reverse-conductive type semiconductor switches so as to turn off all the reverse-conductive type semiconductor switches to cut off the current, when an output of the current detection unit exceeds a predetermined current value.

6. The protection circuit equipped magnetic energy recovery switch according to claim 1, wherein the control means controls gates of the reverse-conductive type semiconductor switches so as to turn off only that of the reverse-conductive type semiconductor switches which is on, thereby cutting off the current, when an output of the current detection unit exceeds a predetermined current value.

7. A protection circuit equipped magnetic energy recovery switch comprising:
a magnetic energy recovery switch, interposed between an AC power supply and a load, for storing magnetic energy of a current, and recovering the magnetic energy to the load; and
protection means for protecting the magnetic energy recovery switch against an overvoltage or an overcurrent,
wherein the magnetic energy recovery switch includes a bridge circuit having two series-connected reverse-conductive type semiconductor switches and two series-connected diodes, first and second capacitors connected in series to each other and respectively connected in parallel to the two series-connected diodes, and control means that controls phases of gate control signals for the reverse-conductive type semiconductor switches in such a way as to alternately perform ON/OFF control on the reverse-conductive type semiconductor switches in synchronization with a frequency of the AC power supply,
wherein the protection means includes, between DC terminals of the bridge circuit, a first voltage detection unit connected in parallel to the first capacitor to detect a voltage of the first capacitor, a second voltage detection unit connected in parallel to the second capacitor to detect a voltage of the second capacitor, a first discharge circuit connected in parallel to the first capacitor and having a first discharge resistor and a first discharge switch connected in series to each other, a second discharge circuit connected in parallel to the second capacitor and having a second discharge resistor and a second discharge switch connected in series to each other, and a current detection unit, interposed between the AC power supply and the load, for detecting a current which flows across the load, and
wherein the control means controls gates of the discharge switches so as to short-circuit the first discharge switch when an output of the first voltage detection unit exceeds a first predetermined value, thereby discharging electric charge of the first capacitor through the first discharge resistor, and short-circuit the second discharge switch when an output of the second voltage detection unit exceeds a second predetermined value, thereby discharging electric charge of the second capacitor through the second discharge resistor, and performs current limiting control by making a duty ratio of an ON pulse of the gate control signals of the reverse-conductive type semiconductor switches smaller than 0.5 when the output of the current detection unit exceeds a predetermined current value.

8. The protection circuit equipped magnetic energy recovery switch according to claim 7, wherein when the output of the current detection unit returns to the predetermined value, the control means sets back the duty ratio of the ON/OFF pulse of the gate control signal of the reverse-conductive type semiconductor switch to 0.5 and terminates current limiting control.

9. The protection circuit equipped magnetic energy recovery switch according to claim 7, wherein when a period of time during which the output of the voltage detection unit is greater than the predetermined voltage value exceeds a predetermined time, the control means controls gates of the reverse-conductive type semiconductor switches so as to turn off all the reverse-conductive type semiconductor switches to cut off the current.

10. The protection circuit equipped magnetic energy recovery switch according to claim 7, wherein when a period of time during which the output of the voltage detection unit is greater than the predetermined voltage value exceeds a predetermined time, the control means controls the gate of the discharge switch so as to discharge electric charges of the two capacitors to set the voltage to substantially zero, and then controls gates of the reverse-conductive type semiconductor switches so as to turn on all the reverse-conductive type semiconductor switches so that the current becomes conductive in both directions.

11. The protection circuit equipped magnetic energy recovery switch according to claim 7, wherein the control means controls gates of the reverse-conductive type semiconductor switches so as to turn off all the reverse-conductive type semiconductor switches to cut off the current, when an output of the current detection unit exceeds a predetermined current value.

12. A protection circuit equipped magnetic energy recovery switch comprising:
a magnetic energy recovery switch, interposed between an AC power supply and a load, for storing magnetic energy of a current, and recovering the magnetic energy to the load; and
protection means for protecting the magnetic energy recovery switch against an overvoltage or an overcurrent,
wherein the magnetic energy recovery switch includes two inversely series-connected reverse-conductive type semiconductor switches, series-connected first and second capacitors connected in parallel thereto, a wiring connecting an intermediate node between the two inversely series-connected reverse-conductive type semiconductor switches and an intermediate node between the two series-connected first and second capacitors, and control means that controls phases of gate control signals for the reverse-conductive type semiconductor switches in such a way as to alternately perform ON/OFF control on the reverse-conductive type semiconductor switches in synchronization with a frequency of the AC power supply,
wherein the protection means includes a first voltage detection unit connected in parallel to the first capacitor to detect a voltage of the first capacitor, a second voltage detection unit connected in parallel to the second capacitor to detect a voltage of the second capacitor, a first discharge circuit connected in parallel to the first capacitor and having a first discharge resistor and a first discharge switch connected in series to each other, a second discharge circuit connected in parallel to the second capacitor and having a second discharge resistor and a second discharge switch connected in series to each other, and a current detection unit, interposed between the AC power supply and the load, for detecting a current which flows across the load, and wherein the control means controls gates of the discharge switches so as to short-circuit the first discharge switch when an output of the first voltage detection unit exceeds a predetermined value, thereby discharging electric charge of the first capacitor through the first discharge resistor, and short-circuit the second discharge switch when an output of the second voltage detection unit exceeds a predetermined value, thereby discharging electric charge of the second capacitor through the second discharge resistor, and performs current limiting control by making a duty ratio of an ON pulse of the gate control signals of the reverse-conductive type semiconductor switches smaller than 0.5 when the output of the current detection unit exceeds a predetermined current value.

13. The protection circuit equipped magnetic energy recovery switch according to claim 12, wherein when the output of the current detection unit returns to the predetermined value, the control means sets back the duty ratio of the ON/OFF pulse of the gate control signal of the reverse-conductive type semiconductor switch to 0.5 and terminates current limiting control.

14. The protection circuit equipped magnetic energy recovery switch according to claim 12, wherein when a period of time during which the output of the voltage detection unit is greater than the predetermined voltage value exceeds a predetermined time, the control means controls gates of the reverse-conductive type semiconductor switches so as to turn off all the reverse-conductive type semiconductor switches to cut off the current.

15. The protection circuit equipped magnetic energy recovery switch according to claim 12, wherein when a period of time during which the output of the voltage detection unit is greater than the predetermined voltage value exceeds a predetermined time, the control means controls the gate of the discharge switch so as to discharge electric charges of the two capacitors to set the voltage to substantially zero, and then controls gates of the reverse-conductive type semiconductor switches so as to turn on all the reverse-conductive type semiconductor switches so that the current becomes conductive in both directions.

16. The protection circuit equipped magnetic energy recovery switch according to claim 12, wherein the control means controls gates of the reverse-conductive type semiconductor switches so as to turn off all the reverse-conductive type semiconductor switches to cut off the current, when an output of the current detection unit exceeds a predetermined current value.

17. A protection circuit equipped magnetic energy recovery switch comprising:
a magnetic energy recovery switch, interposed between an AC power supply and a load, for storing magnetic energy of a current, and recovering the magnetic energy to the load; and
protection means for protecting the magnetic energy recovery switch against an overvoltage or an overcurrent,
wherein the magnetic energy recovery switch includes a bridge circuit having two series-connected reverse-conductive type semiconductor switches and two series-connected diodes, two series-connected capacitors respectively connected in parallel to the two series-connected diodes, and control means that controls phases of gate control signals for the reverse-conductive type semiconductor switches in such a way as to alternately perform ON/OFF control on the reverse-conductive type semiconductor switches in synchronization with a frequency of the AC power supply,
wherein the protection means includes a voltage detection unit connected between DC terminals of the bridge circuit to detect a voltage across the two series-connected capacitors, a discharge circuit connected between the DC terminals of the bridge circuit and having a discharge resistor and a discharge switch connected in series to each other, and
wherein when a period of time during which the output of the voltage detection unit is greater than the predetermined voltage value exceeds a predetermined time, the control means controls the gate of the discharge switch so as to discharge electric charges of the two capacitors to set the voltage to substantially zero, and then controls gates of the reverse-conductive type semiconductor switches so as to turn on all the reverse-conductive type semiconductor switches so that the current becomes conductive in both directions.

18. The protection circuit equipped magnetic energy recovery switch according to claim 17, wherein the protection means further includes a current detection unit, interposed between the AC power supply and the load, for detecting a current which flows across the load, and
performs current limiting control by making a duty ratio of an ON pulse of the gate control signals of the reverse-conductive type semiconductor switches smaller than 0.5 when the output of the current detection unit exceeds a predetermined value.

19. A protection circuit equipped magnetic energy recovery switch comprising:
a magnetic energy recovery switch, interposed between an AC power supply and a load, for storing magnetic energy of a current, and recovering the magnetic energy to the load; and
protection means for protecting the magnetic energy recovery switch against an overvoltage or an overcurrent,
wherein the magnetic energy recovery switch includes a bridge circuit having two series-connected reverse-conductive type semiconductor switches and two series-connected diodes, first and second capacitors connected in series to each other and respectively connected in parallel to the two series-connected diodes, and control means that controls phases of gate control signals for the reverse-conductive type semiconductor switches in such a way as to alternately perform ON/OFF control on the reverse-conductive type semiconductor switches in synchronization with a frequency of the AC power supply,
wherein the protection means includes, between DC terminals of the bridge circuit, a first voltage detection unit connected in parallel to the first capacitor to detect a voltage of the first capacitor, a second voltage detection unit connected in parallel to the second capacitor to detect a voltage of the second capacitor, a first discharge circuit connected in parallel to the first capacitor and having a first discharge resistor and a first discharge switch connected in series to each other, a second discharge circuit connected in parallel to the second capacitor and having a second discharge resistor and a second discharge switch connected in series to each other, and wherein the control means controls gates of the discharge switches so as to short-circuit the first discharge switch when an output of the first voltage detection unit exceeds a first predetermined value, thereby discharging electric charge of the first capacitor through the first discharge resistor, and short-circuit the second discharge switch when an output of the second voltage detection unit exceeds a second predetermined value, thereby discharging electric charge of the second capacitor through the second discharge resistor, and then controls gates of the reverse-conductive type semiconductor switches so as to turn on all the reverse-conductive type semiconductor switches so that the current becomes conductive in both directions.

20. The protection circuit equipped magnetic energy recovery switch according to claim 19, wherein the protection means further includes a current detection unit, interposed between the AC power supply and the load, for detecting a current which flows across the load, and performs current limiting control by making a duty ratio of an ON pulse of the gate control signals of the reverse-conductive type semiconductor switches smaller than 0.5 when the output of the current detection unit exceeds a predetermined value.

21. A protection circuit equipped magnetic energy recovery switch comprising:

a magnetic energy recovery switch, interposed between an AC power supply and a load, for storing magnetic energy of a current, and recovering the magnetic energy to the load; and protection means for protecting the magnetic energy recovery switch against an overvoltage or an overcurrent, wherein the magnetic energy recovery switch includes two inversely series-connected reverse-conductive type semiconductor switches, series-connected first and second capacitors connected in parallel thereto, a wiring connecting an intermediate node between the two inversely series-connected reverse-conductive type semiconductor switches and an intermediate node between the two series-connected first and second capacitors, and control means that controls phases of gate control signals for the reverse-conductive type semiconductor switches in such a way as to alternately perform ON/OFF control on the reverse-conductive type semiconductor switches in synchronization with a frequency of the AC power supply, wherein the protection means includes a first voltage detection unit connected in parallel to the first capacitor to detect a voltage of the first capacitor, a second voltage detection unit connected in parallel to the second capacitor to detect a voltage of the second capacitor, a first discharge circuit connected in parallel to the first capacitor and having a first discharge resistor and a first discharge switch connected in series to each other, a second discharge circuit connected in parallel to the second capacitor and having a second discharge resistor and a second discharge switch connected in series to each other, and wherein the control means controls gates of the discharge switches so as to short-circuit the first discharge switch when an output of the first voltage detection unit exceeds a predetermined value, thereby discharging electric charge of the first capacitor through the first discharge resistor, and short-circuit the second discharge switch when an output of the second voltage detection unit exceeds a predetermined value, thereby discharging electric charge of the second capacitor through the second discharge resistor, and then controls gates of the reverse-conductive type semiconductor switches so as to turn on all the reverse-conductive type semiconductor switches so that the current becomes conductive in both directions.

22. The protection circuit equipped magnetic energy recovery switch according to claim 21, wherein the protection means further includes a current detection unit, interposed between the AC power supply and the load, for detecting a current which flows across the load, and performs current limiting control by making a duty ratio of an ON pulse of the gate control signals of the reverse-conductive type semiconductor switches smaller than 0.5 when the output of the current detection unit exceeds a predetermined value.

* * * * *